(12) United States Patent
Miyazaki et al.

(10) Patent No.: US 11,644,734 B2
(45) Date of Patent: May 9, 2023

(54) OPTICAL MODULATOR AND OPTICAL MODULE USING SAME

(71) Applicant: SUMITOMO OSAKA CEMENT CO., LTD., Tokyo (JP)

(72) Inventors: Norikazu Miyazaki, Tokyo (JP); Toru Sugamata, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 143 days.

(21) Appl. No.: 17/276,614

(22) PCT Filed: Jul. 3, 2019

(86) PCT No.: PCT/JP2019/026501
§ 371 (c)(1),
(2) Date: Mar. 16, 2021

(87) PCT Pub. No.: WO2020/059250
PCT Pub. Date: Mar. 26, 2020

(65) Prior Publication Data
US 2022/0043322 A1    Feb. 10, 2022

(30) Foreign Application Priority Data

Sep. 19, 2018  (JP) .............................. JP2018-175218

(51) Int. Cl.
*G02F 1/035*    (2006.01)
*G02F 1/295*    (2006.01)
(Continued)

(52) U.S. Cl.
CPC .............. *G02F 1/225* (2013.01); *G02F 1/212* (2021.01); *G02F 2202/20* (2013.01)

(58) Field of Classification Search
CPC ....... G02F 1/225; G02F 1/212; G02F 2202/20
(Continued)

(56) References Cited

U.S. PATENT DOCUMENTS

2003/0147575 A1* 8/2003 Sugiyama ............. G02F 1/0305
                                                           385/2
2003/0180030 A1* 9/2003 Hirose ..................... G02B 6/12
                                                         385/147

FOREIGN PATENT DOCUMENTS

JP    2003-233048 A    8/2003
JP    2004-258504 A    9/2004
(Continued)

OTHER PUBLICATIONS

International Search Report dated Sep. 17, 2019, 2 pages.

*Primary Examiner* — Kaveh C Kianni
*Assistant Examiner* — Hung Q Lam
(74) *Attorney, Agent, or Firm* — Rankin, Hill & Clark LLP

(57) ABSTRACT

An optical modulator includes an optical modulation element including an optical waveguide formed on a substrate and a housing that accommodates the optical modulation element, the housing has a bottom surface wall having a quadrilateral shape in a plan view, first and second long side walls that are connected to two opposite edges of the bottom surface wall, and first and second short side walls that are shorter than the first and second long side walls and are connected to two other opposite edges of the bottom surface wall. An average wall thickness of the second long side wall is equal to or larger than an average wall thickness of the first long side wall. At least one of the first and second short side walls has an average thickness that is thinner than the average thickness of the first long side wall.

9 Claims, 17 Drawing Sheets

(51) Int. Cl.
    *G02B 6/12*     (2006.01)
    *G02F 1/225*     (2006.01)
    *G02F 1/21*     (2006.01)

(58) Field of Classification Search
    USPC .................. 385/1–8, 14, 40, 49, 129–132
    See application file for complete search history.

(56) References Cited

FOREIGN PATENT DOCUMENTS

| | | | |
|---|---|---|---|
| JP | 2014-149393 A | | 8/2014 |
| JP | 2015-069162 A | | 4/2015 |
| JP | 2015-102786 A | | 6/2015 |
| JP | 2016-99508 A | | 5/2016 |
| JP | 2019053313 A | * | 4/2019 |

* cited by examiner

OPTICAL MODULATOR AND OPTICAL MODULE USING SAME

TECHNICAL FIELD

The present invention relates to an optical modulator and an optical module that performs an optical communication operation using the optical modulator.

BACKGROUND ART

In recent years, the digital coherent transmission technology, which started to be applied to long-distance optical communication, also has been continuously applied to metro optical communication such as medium-distance and short-distance optical communication due to an additionally increasing communication demand. In such digital coherent transmission, dual polarization-quadrature phase shift keying (DP-QPSK) modulators in which a LiNbO3 (hereinafter, referred to as LN) substrate is typically used are used as optical modulators. Hereinafter, optical modulators in which a LiNbO3 substrate is used will be referred to as LN modulators.

Such an optical modulator is used in a state of being mounted in an optical module that performs an optical communication operation together with, for example, a driver integrated circuit (IC) that outputs an electric signal for causing the optical modulator to perform a modulation operation or a circuit board on which a digital signal processor (DSP) that processes a signal input from a higher-level device at a high frequency and inputs transmission data to the driver IC is disposed.

In short-distance applications such as metro optical communication, there is a high demand particularly for the size reduction of optical modules, and, in the future, the mounting densities of optical components and electronic components in an optical module housing gradually increase due to an increasing demand for additional size reduction. As a result, it may be necessary to dispose a heat-generating electronic part such as a driver IC or a DSP extremely close to an optical modulator in an optical module housing.

Typically, a driver IC outputs high-frequency signals having a voltage magnitude of several volts to several tens of volts and consumes approximately 1 W of electricity. In addition, a DSP that is used, particularly, in optical modules is an element (or a device) that processes signals of several tens of Gbps at a high frequency and consumes approximately 10 to 30 W of electricity. In addition, the consumed power is emitted from the driver IC or DSP mainly as heat.

Meanwhile, optical modulators include an optical crystal (for example, the above-described LN) that is relatively sensitive to temperature in terms of characteristics and reliability in a housing (modulator housing) and accommodate an optical component requiring submicron-level positional accuracy.

Therefore, conventionally, in an optical module housing, an optical modulator and a heat-generating electronic part are disposed at positions that are as far apart as possible such that heat emitted from the heat-generating electronic part does not affect the optical modulator. In addition, in order to suppress the temperature of each portion in the optical module housing being raised by heat generated from the heat-generating electronic part, it is also proposed to dissipate heat from the heat-generating electronic part to the outside of the optical module by bringing the heat-generating electronic part into contact with the optical module housing directly or through a heat-dissipating gel (for example, Patent Literature 1).

However, as the size reduction of optical modules progresses, it is inevitable to dispose an optical modulator and a heat-generating electronic part close to each other, and there is a demand for an optical modulator capable of avoiding the degradation of characteristics and long-term reliability even in the case of being disposed close to a heat-generating electronic part.

As techniques for suppressing the degradation of the reliability of optical modulators or the like attributed to heat applied from the outside, for example, Patent Literature 2 discloses the reduction of the wall thickness of the housing between a feedthrough-fixed portion and an optical modulation element-fixed portion in order to prevent the occurrence of deterioration or breakdown in an optical modulation element in the housing due to heat generated at the time of fixing a feedthrough portion, into which an optical fiber is introduced, to the housing by soldering during manufacturing.

However, the configuration described in Patent Literature 2 is intended to prevent heat generated only in the fixation-by-soldering step during manufacturing and applied for an extremely short period of time of approximately several seconds to several tens of seconds from being transferred to the optical modulation element. This configuration is not a technique intended to enlighten a measure for preventing the variation of optical characteristics attributed to heat that is continuously applied from the outside during operation of optical modulators or the degradation of long-term reliability attributed to heat that is continuously applied during the long-term operation of optical modulators.

Furthermore, usually, optical modulator housing are designed to have as uniform a wall thickness as possible from the viewpoint of ease of manufacturing or the avoidance of stress concentration during the fluctuation of the ambient temperature. In contrast, to a modulator housing of an optical modulator mounted in an optical module housing, unlike a case where heat is uniformly applied from all directions in association with the fluctuation of the ambient temperature, heat is often applied locally from a heat-generating electronic part.

FIG. 15 is a plan view schematically showing an example of the configuration of a conventional optical modulator 1500. In addition, FIG. 16 is a cross-sectional view taken along the line JJ in FIG. 15. The optical modulator 1500 shown in the drawings includes, for example, an optical modulation element 1502 and a modulator housing 1504 that accommodates the optical modulation element 1502. It should be noted that, in FIG. 15, in order to facilitate the understanding of the internal configuration of the modulator housing 1504, a cover 1530 that seals the modulator housing 1504, which is shown in FIG. 16, is not shown.

The optical modulation element 1502 is, for example, a Mach-Zehnder optical modulator, which is a so-called interference type optical modulation element that operates using the interference of light by controlling the phase difference between parallel waveguides formed on a LN substrate. In addition, the optical modulator 1500 includes an input optical fiber 1508 that inputs light to the optical modulation element 1502 and an output optical fiber 1510 that outputs light modulated by the optical modulation element 1502. In the optical modulation element 1502, for example, the input optical fiber 1508 is adhered to the right end in the drawing, which is a light input end, through a capillary 1540, and a microlens array 1542 is adhered to the left end in the drawing, which is a light output end. In addition, to the respective ends of the optical modulation element 1502, reinforcing blocks 1544-1 and 1544-2 for ensuring the adhesive strengths of the capillary 1540 and the microlens array 1542 are adhered, respectively.

The modulator housing 1504 usually has a substantially rectangular shape in a plan view and is configured in the same thickness that is large enough to ensure necessary stiffness such that the respective wall thicknesses of side surface walls 1520, 1522, 1524, and 1526 at the four sides in FIG. 15 and a bottom surface wall 1528 shown in FIG. 16 become as uniform as possible. In addition, the optical modulation element 1502 is disposed on the bottom surface wall 1528, and an optical component 1546 such as a polarization beam combining prism is also disposed on the bottom surface wall 1528 in some cases.

In reality, in the modulator housing 1504, a lead pin (not shown), a relay board, or the like for inputting a high-frequency signal that is to be input to the optical modulation element 1502 from the outside of the modulator housing 1504 is mounted, and a protrusion and a recess are provided as necessary on the inner surface portion of the side surface wall 1520, 1522, 1524, or 1526 or the bottom surface wall 1528. However, these protrusion and recess are provided in an extremely limited range as necessary in order for the disposition of an auxiliary component and do not cause any meaningful unevenness in the wall thicknesses of the side surface walls 1520, 1522, 1524, and 1526 and the bottom surface wall 1528 of the modulator housing 1504. It is necessary to understand that FIG. 15 and FIG. 16 schematically show the modulator housing 1504 such that the wall thickness of each of the side surface walls 1520, 1522, 1524, and 1526 and the bottom surface wall 1528 is the average thickness at each side.

The conventional optical modulator 1500 is configured such that (the average values of) the wall thicknesses of the side surface walls 1520, 1522, 1524, and 1526 and the bottom surface wall 1528 of the modulator housing 1504 become substantially the same value t15 and has a structure that is symmetrical with respect to a center line 1550 with respect to the width direction and a center line 1552 with respect to the length direction. Therefore, in a case where heat from the ambient environment of the optical modulator 1500 is uniformly applied to the modulator housing 1504, the deformation of the modulator housing 1504 is suppressed in a minute range, and the degree of the variation of the characteristics or the degradation of reliability is also suppressed. Here, the "average value" of the wall thickness refers to the average value of the partial thickness of the corresponding wall or walls, and, even in a case where the wall or a part of the wall is connected to or intersects an adjacent wall, the average value refers to the average value of the thickness of the so-called "wall" itself or the part of the "wall" itself, not including the connecting or intersecting part. For example, in a case where the inner surface of the corresponding wall or a part of the wall (the inside surface of the modulator housing) is connected to the inner surface of an adjacent wall through a curved portion (R-processed portion), the average value refers to the average value of the thickness of the "wall" itself or the part of the "wall" itself, excluding the curved portion.

In a case where the optical modulator 1500 is mounted in an optical module having a further reduced size, it is necessary to dispose a heat-generating electronic part near the optical modulator in consideration of the loss of an electrical signal, and heat propagating from the heat-generating electronic part usually propagates to a part of the modulator housing 1504 almost locally and diffuses toward the entire modulator housing 1504. Therefore, in the optical module, usually, heat is not uniformly applied to the modulator housing 1504.

FIG. 17 schematically shows a temperature distribution generated in the modulator housing 1504 in a case where the optical modulator 1500 is mounted on a circuit board 1702 of an optical module together with, for example, a DSP 1700, which is a heat-generating electronic part. Black/white shades shown over the modulator housing 1504 shown in the drawing indicate the temperatures of individual portions and indicate that, as the white shade becomes lighter, the temperature becomes lower, and, as the black shade becomes darker, the temperature becomes higher.

In the drawing, heat from the DSP 1700 disposed on the lower right side of the drawing on the circuit board 1702 mainly propagates through the circuit board 1702 and flows into the modulator housing 1504 from a portion that faces the DSP 1700 on a side of the modulator housing 1504 on the lower side of the drawing. In addition, the heat that has flowed in from the portion propagates to the upper left side of the drawing toward the entire modulator housing 1504.

As a result, in the modulator housing 1504, a temperature gradient is generated such that the temperature decreases from the lower right side to the upper left side as shown in the drawing. Such a temperature gradient is not generated in a case where the temperature of the entire modulator housing 1504 changes in association with a change in the environmental temperature and is generated due to the fact that the DSP 1700 acts as an eccentric heat source that is positioned asymmetrically with respect to the modulator housing 1504. More specifically, this temperature gradient arises from the fact that the size of the DSP 1700 is usually smaller than the size of the modulator housing 1504 and the DSP 1700 is disposed close to a part of the side of the modulator housing 1504.

In addition, as a result of the DSP 1700 acting as an asymmetric and eccentric heat source as described above, this temperature gradient is generated along a direction 1704 (the white broken line in the drawing) that is different from both directions of the center line 1550 with respect to the width direction and the center line 1552 with respect to the longitudinal direction of the modulator housing 1504 as shown in the drawing and generates an asymmetric temperature distribution in the modulator housing 1504.

Such an asymmetric temperature distribution in the modulator housing 1504 is significantly different from a temperature change that is expected by the design concept of the conventional modulator housing 1504, which is "making the wall thicknesses on the four sides the same to suppress deformation", that is, "a uniform temperature change" in the modulator housing 1504 and may cause characteristic variations and the degradation of long-term reliability that are beyond designers' prediction.

For example, in an accelerated aging test for predicting the long-term reliability of electronic components and optical components regulated in industrial standards such as Telcordia or JIS, optical modulators, which are test objects, are put into constant-temperature baths set to a variety of temperatures (for example, 100° C., 125° C., and the like), respectively, and the amounts of characteristic variations of the respective optical modulators are measured whenever predetermined elapsed times are reached. That is, what is predicted from such an accelerated aging test is long-term reliability in a case where the optical modulator 1500 is continuously used in a uniform temperature state. Therefore, the long-term reliability of an actual optical modulator 1500 where an asymmetric temperature distribution is generated in an optical module as described above may become significantly different from the above-described prediction.

In addition, due to the asymmetric temperature distribution in the modulator housing 1504, an asymmetric temperature distribution is also generated in the surface of a substrate that configures the optical modulation element 1502. Therefore, particularly, in a case where an interference type optical modulation element such as a Mach-Zehnder optical modulator is used as the optical modulation element 1502, mutually different additional phase differences that are attributed to the asymmetric temperature distribution are generated between parallel waveguides adjacent to each other on the substrate, and the characteristics such as the extinction ratio or optical output characteristics and reliability of the optical modulation element 1502 itself may also be adversely affected. That is, in an optical modulator in which an interference type optical modulation element is used, due to an asymmetric temperature distribution that is generated over a long period of time by the disposition of the optical modulator close to a heat-generating electronic part, it is expected that characteristic variations and the degradation of reliability that cannot be predicted in the accelerated aging test or the like occurs particularly significantly.

CITATION LIST

Patent Literature

[Patent Literature No. 1] Japanese Laid-open Patent Publication No. 2016-99508
[Patent Literature No. 2] Japanese Laid-open Patent Publication No. 2015-102786

SUMMARY OF INVENTION

Technical Problem

From the above-described background, there is a desire for realizing an optical modulator capable of suppress characteristic variations and the degradation of long-term reliability attributed to the disposition of a heat source such as an electronic component close to the optical modulator.

Solution to Problem

One aspect of the present invention is an optical modulator including an optical modulation element including an optical waveguide formed on a substrate and a housing that accommodates the optical modulation element, the housing has a bottom surface wall having a quadrilateral shape in a plan view, a first long side wall and a second long side wall that are connected to two opposite edges of the bottom surface wall, and a first short side wall and a second short side wall that are shorter than the first long side wall and the second long side wall and are connected to two other opposite edges of the bottom surface wall, an average thickness of the second long side wall has a wall thickness that is equal to or larger than an average thickness of the first long side wall, at least one of the first and second short side walls has an average thickness that is thinner than the average thickness of the first long side wall, the optical modulation element is fixed to a pedestal part disposed in a part of the bottom surface wall, and a highly thermal resistant portion is provided in a part of the bottom surface wall other than the part in which the pedestal part is disposed.

Another aspect of the present invention is an optical modulator including an optical modulation element including an optical waveguide formed on a substrate and a housing that accommodates the optical modulation element, the housing has a bottom surface wall having a quadrilateral shape in a plan view, a first long side wall and a second long side wall that are connected to two opposite edges of the bottom surface wall, and a first short side wall and a second short side wall that are shorter than the first long side wall and the second long side wall and are connected to two other opposite edges of the bottom surface wall, the optical modulation element is fixed to a pedestal part disposed in a part of the bottom surface wall, an average thickness of the pedestal part is thicker than average thicknesses of the first short side wall, the second short side wall, the first long side wall, and the second long side wall, and a highly thermal resistant portion is provided in a part of the bottom surface wall other than the part in which the pedestal part is disposed.

According to another aspect of the present invention, a light input end and a light output end of the optical modulation element face the first short side wall and the second short side wall, respectively, and a region of the highly thermal resistant portion is formed as a region including a part or an entirety of an optical input portion and an optical output portion, in which the optical input portion is a range from an inner surface of the first short side wall to the light input end of the optical modulation element and the optical output portion is a range from an inner surface of the second short side wall to the light output end of the optical modulation element.

According to another aspect of the present invention, an average thickness of the highly thermal resistant portion is thinner than the average thickness of the pedestal part.

According to another aspect of the present invention, a first optical component is disposed in the optical input portion or the optical output portion.

According to another aspect of the present invention, a second optical component is disposed in at least one end part of the optical modulation element, and, in the optical modulation element, the second optical component is disposed so as to protrude outside a range of the pedestal part.

According to another aspect of the present invention, the optical modulation element is an interference type optical modulation element that operates by causing two light rays that propagate through the optical waveguides extending in a length direction of the optical modulation element to interfere with each other.

Still another aspect of the present invention is an optical module including any of the above-described optical modulators and a heating element that is an electric component accompanying heat generation, in which the heating element is disposed at the second long side wall side of the optical modulator.

It should be noted that the entire contents of Japanese Patent Application No. 2018-175218 filed on Sep. 19, 2018 is incorporated into this specification by reference.

Advantageous Effects of Invention

According to the present invention, in an optical modulator, even in a case where a heat source such as an electronic component is disposed close to the optical modulator, it is possible to suppress characteristic variations or the degradation of long-term reliability attributed to the above-described disposition by suppressing the generation of an asymmetric temperature distribution in a modulator housing.

DESCRIPTION OF EMBODIMENTS

Hereinafter, embodiments of the present invention will be described with reference to drawings.

In an optical modulator according to the present invention, a thickness of the bottom surface wall of a modulator housing as well as thicknesses of the side surface walls are adjusted such that the modulator housing actively acts as a heat sink or a favorable thermal conductor. In addition, at that time, unlike the related art, the thermal conduction to an optical modulation element is not avoided, and, on the basis of an idea totally opposite to the related art, the housing is configured to allow heat to be easily conducted to the entire optical modulation element, but an optical input and output portion in which an optical component is mounted is configured to suppress thermal conduction. Therefore, an asymmetric temperature distribution in the optical modulation element is avoided, the thermal conduction to the optical component is avoided, and characteristic variations and the degradation of long-term reliability in the optical modulator as a whole are avoided.

First Embodiment

Figure 1:
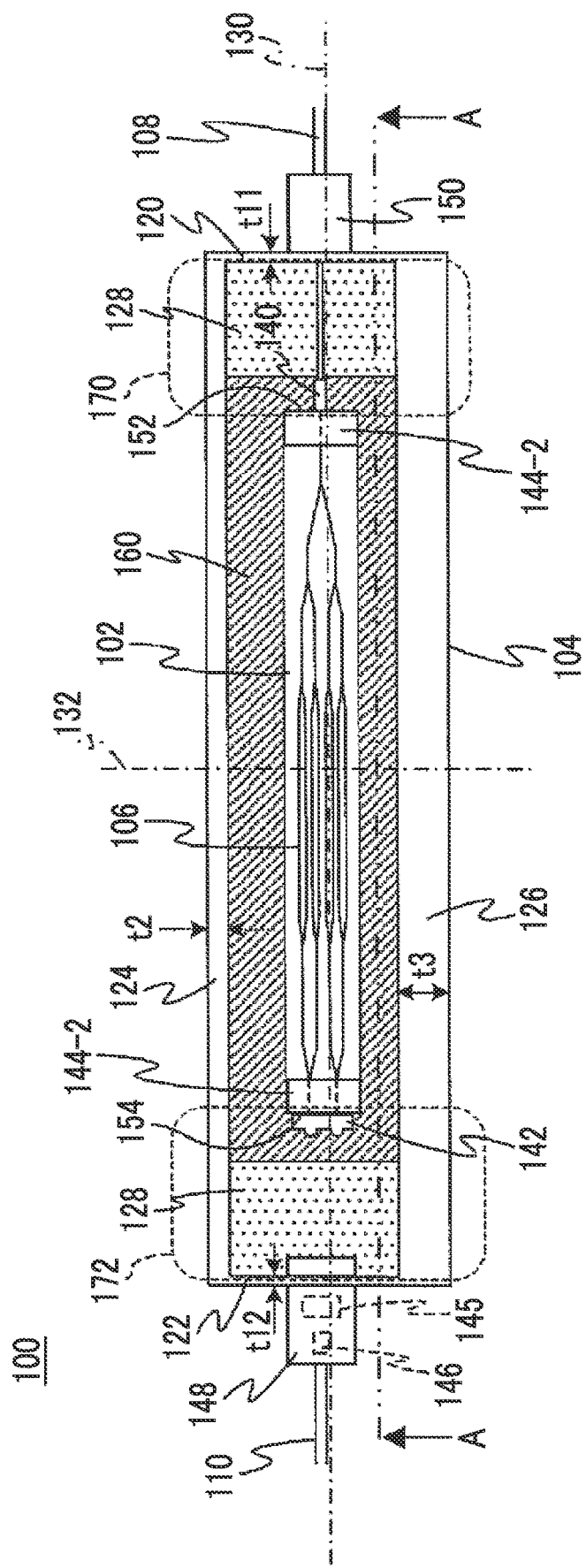
FIG. 1 is a plan view of an optical modulator according to a first embodiment of the present invention.
Figure 2:
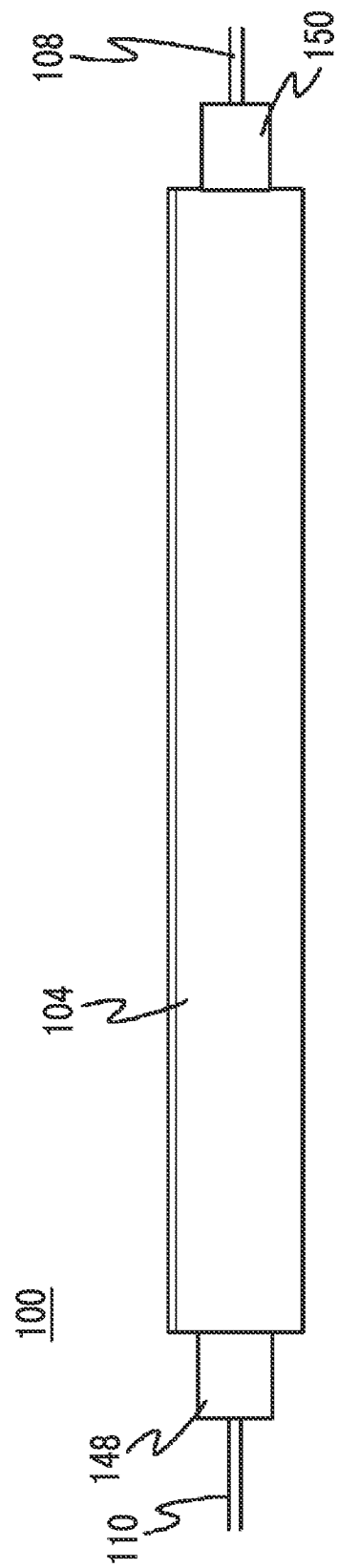
FIG. 2 is a side view of the optical modulator shown in FIG. 1.
Figure 3:
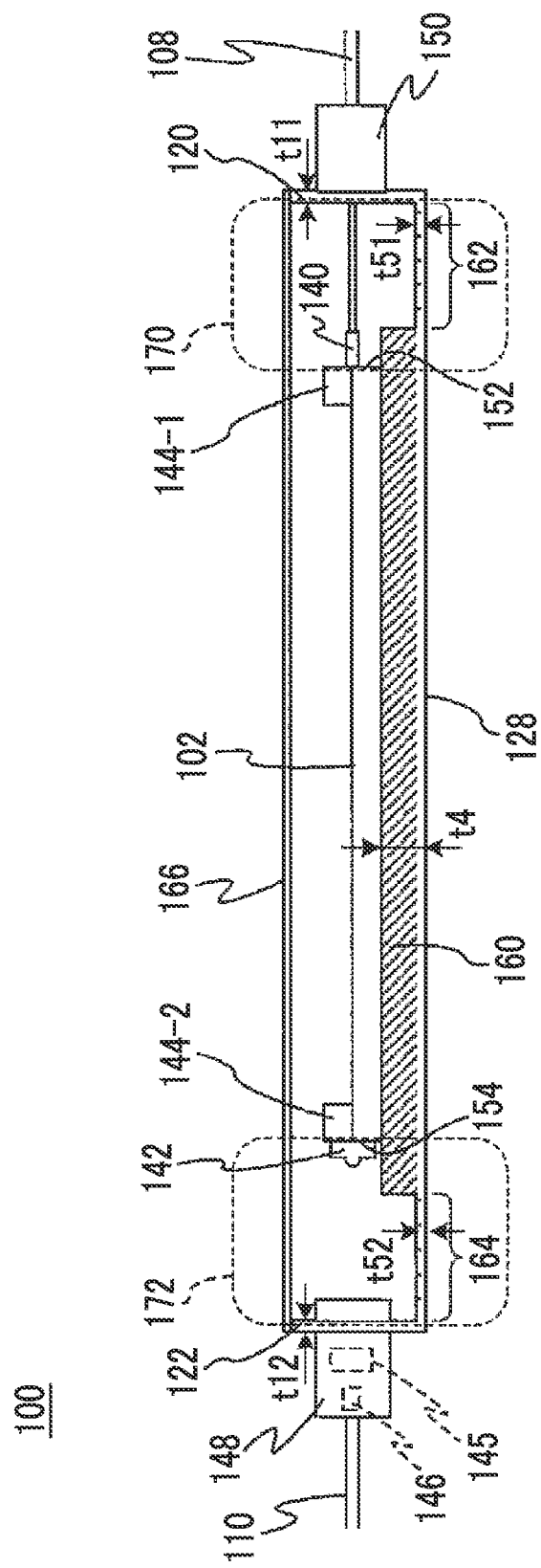
FIG. 3 is a cross-sectional view of the optical modulator shown in FIG. 1 taken along the line AA.

FIG. 1 is a plan view showing the configuration of an optical modulator 100 according to a first embodiment of the present invention, FIG. 2 is a side view of the optical modulator 100, and FIG. 3 is a cross-sectional view of the optical modulator 100 shown in FIG. 1 taken along the line AA.

The optical modulator 100 includes an optical modulation element 102, a modulator housing 104 that accommodates the optical modulation element 102, an input optical fiber 108 that inputs light to the optical modulation element 102, and an output optical fiber 110 that guides light output from the optical modulation element 102 to the outside of the modulator housing 104.

It should be noted that, since the modulator housing 104 is airtightly sealed, it is not possible to actually observe the inside of the modulator housing 104; however, in FIG. 1, configuration elements in the modulator housing 104 are indicated with solid lines in order to facilitate the understanding of the configuration in the modulator housing 104.

The modulator housing 104 is made of metal (for example, stainless steel, KOVAR, or the like) and has a rectangular shape or a quadrilateral shape (for example, an oblong shape or a substantially oblong shape) in a plan view. That is, the modulator housing 104 has a bottom surface wall 128 having a quadrilateral shape in a plan view, a long side wall 124 and a long side wall 126 that are connected to two opposite edges (the two (upper and lower) sides in the drawing of FIG. 1) of the bottom surface wall 128. In addition, the modulator housing 104 has a short side wall 120 and a short side wall 122 that are shorter than the long side walls 124 and 126 and are connected to two other opposite edges (the right and left sides in the drawing) of the bottom surface wall 128. Additionally, the optical modulation element 102 is accommodated in a space surrounded by the bottom surface wall 128, the long side walls 124 and 126, and the short side walls 120 and 122. Here, in a plan view of the modulator housing 104, a line extending in the horizontal direction in the drawing along the center of the modulator housing 104 in the width direction is defined as a center line 130 with respect to the width direction, and a line extending in the vertical direction in the drawing along the center of the modulator housing with respect to the length direction is defined as a center line 132 with respect to the length direction.

The optical modulation element 102 is, for example, an interference type optical modulation element that operates by causing light that propagates through, among optical waveguides 106, two optical waveguides extending in the length direction of the optical modulation element 102 to interfere with each other. Specifically, in the present embodiment, the optical modulation element 102 is a DP-QPSK optical modulator including four Mach-Zehnder type optical waveguides provided on a $LiNbO_3$ substrate and four RF electrodes (not shown) that are provided on the Mach-Zehnder type optical waveguides, respectively, and modulate light waves that propagate through the optical waveguides.

In FIG. 1, the end portion of the optical modulation element 102 on the right side in the drawing is a light input end 152 to which light is input, and the end portion on the left side in the drawing is a light output end 154 from which modulated light is output. In the optical modulation element 102, the light input end 152 and the light output end 154 are disposed to face the short side wall 120 and the short side wall 122, respectively. A light input terminal portion 150 that holds the input optical fiber 108 is fixed to the short side wall 120, and a light output terminal portion 148 that holds the output optical fiber 110 is fixed to the short side wall 122.

The end portion of the input optical fiber 108 introduced into the inside of the modulator housing 104 through the light input terminal portion 150 is inserted into a capillary 140, which is an optical component, and is fixed to the light input end 152 of the optical modulation element 102. The capillary 140 is made of, for example, glass. It should be noted that the input of light to the optical modulation element 102 may be a space optical system in which a lens or the like is disposed between the input optical fiber 108 and the optical modulation element 102.

Two light rays that are output from the optical modulation element 102 are collimated by two microlenses included in a microlens array 142, which is an optical component. The microlens array 142 is fixed to, for example, the light output end 154 of the optical modulation element 102.

In addition, to the respective ends of the optical modulation element 102, reinforcing blocks 144-1 and 144-2 for ensuring the adhesive strengths of the capillary 140 and the microlens array 142 are adhered, respectively.

The two rays of light that has been output from the light output end 154 of the optical modulation element 102 and collimated by the microlens array 142 are polarized and combined by a polarization-combining part 145. Here, the polarization-combining part 145 includes, for example, a wave plate and a polarization beam combining prism.

The polarized and combined light is coupled to the output optical fiber 110 through a lens 146 and is output. Here, the polarization-combining part 145 and the lens 146, which are optical components, are provided in the light output terminal portion 148. After the output optical fiber 110 is fixed to the light output terminal portion 148, the light output terminal portion 148 is fixed to the short side wall 122 of the modulator housing 104.

As shown in FIG. 3, the optical modulation element 102 is fixed to a pedestal part 160 (diagonally hatched part in the drawing) provided as a part of the bottom surface wall 128 on the inner surface (upper surface in the drawing) of the bottom surface wall 128. In the present embodiment, the pedestal part 160 is configured along the length direction of the modulator housing 104 to be longer than the length of the optical modulation element 102 (that is, the distance from the light input end 152 to the light output end 154). In addition, the entire optical modulation element 102 is disposed within the range of the upper surface (surface shown in FIG. 1) of the pedestal part 160.

In addition, in the optical modulator 100 of the present embodiment, in FIG. 3, the respective thicknesses t51 and t52 of bottom plate portions 162 and 164 that are parts of the bottom surface wall 128 not provided with the pedestal part 160 are formed to be thinner than a thickness t4 (the thickness from the upper surface (surface on the upper side in the drawing of FIG. 3) of the pedestal part 160 to the outer surface (surface on the lower side in the drawing of FIG. 3) of the bottom surface wall 128) of the pedestal part 160. Therefore, the bottom plate portions 162 and 164 configure highly thermal resistant portions (dot-hatched parts shown in the drawing) having high thermal resistance with respect to the part in which the pedestal part 160 is provided. In addition, the highly thermal resistant portions formed of the bottom plate portions 162 and 164, respectively, are provided in parts of an optical input portion 170 that is a range from the inner surface of the short side wall 120 to the light input end 152 of the optical modulation element 102 and an optical output portion 172 that is a range from the inner surface of the short side wall 122 to the light output end 154 of the optical modulation element 102, respectively.

It should be noted that FIG. 3 also shows a cover 166 having a thin plate thickness that configures a part of the modulator housing 104 in an opening portion in the upper portion in the drawing that is formed by the short side walls 120 and 122 of the modulator housing 104. In order to airtightly seal the inner space of the modulator housing 104 in which the optical modulation element 102 is accommodated, the cover 166 is, for example, seam-welded to the four sides configured by the long side walls 124 and 126 and the short side walls 120 and 122 in FIG. 1.

In the modulator housing 104, a plurality of lead pins for inputting high-frequency signals for operating the optical modulation element 102, a relay board for guiding high-frequency signals input from the plurality of lead pins to the RF electrodes in the optical modulation element 102, respectively, or the like may be provided (all are not shown). Therefore, on the inner surfaces of the short side walls 120 and 122 and the long side walls 124 and 126 of the modulator housing 104 and/or on the inner surface of the bottom surface wall 128, protrusions and recesses may be provided. However, in the present embodiment, in order to facilitate understanding by avoiding unnecessarily detailed description, the short side walls 120 and 122 and the long side walls 124 and 126 of the modulator housing 104, the part provided with the pedestal part 160 in the bottom surface wall 128, and the parts not provided with the pedestal part 160 in the bottom surface wall 128 are described to have a uniform thickness, respectively.

Particularly, in the optical modulator 100 of the present embodiment, the modulator housing 104 is configured such that a wall thickness t3 of the long side wall 126 on the lower side in the drawing and a wall thickness t2 of the long side wall 124 on the upper side in the drawing, which is opposite to the long side wall 126, satisfy t3 t2 in FIG. 1. In addition, the modulator housing 104 is configured such that a wall thickness t11 of the short side wall 120 and a wall thickness t12 of the short side wall 122 satisfy t11<t2 and t12<t2. Here, the long side wall 126 having the wall thickness t3 is disposed to face a side on which, for example, a DSP, which is a heat-generating electronic part, is mounted when the optical modulator 100 is mounted on, for example, a circuit board in optical modules.

It should be noted that, as described above, in the present embodiment, FIG. 1, FIG. 2, and FIG. 3 do not show any protrusion and recess for disposing the lead pins, the relay board, or the like, which are possibly provided in an actual modulator housing 104. Therefore, it is necessary to understand that the wall thickness of each of the short side walls 120 and 122, and the long side walls 124 and 126 shown in FIG. 1 and FIG. 3 indicates the average value of the wall thickness in each wall in a case where a protrusion and a recess are provided. That is, in the present embodiment, the wall thickness t11 of the short side wall 120, the wall thickness t12 of the short side wall 122, the wall thickness t2 of the long side wall 124, and the wall thickness t3 of the long side wall 126 are the average value of the wall thickness in each wall, and these average values have relationship of t11<t2≤t3 and t12<t2≤t3.

It should be noted that, in the present specification, the "average value" of the wall thickness refers to the average value of the corresponding wall or the partial thickness of the wall. That is, in a case where the wall or a part of the wall is connected to or intersects an adjacent wall, the average value refers to the average value of the thickness of the so-called "wall" itself or the part of the "wall" itself, not including the connecting or intersecting part. For example, in a case where the inner surface of the corresponding wall or a part of the wall (the inside surface of the modulator housing) is connected to the inner surface of an adjacent wall through a curved portion (R-processed portion), the average value refers to the average value of the thickness of the "wall" itself or the part of the "wall" itself, excluding the curved portion.

In addition, in the present configuration, in a case where the pedestal part 160 is configured to have a protrusion and a recess, the thickness t4 of the pedestal part 160 refers to the average value of the thickness from the upper surface of the pedestal part 160 to the outer surface of the bottom surface wall 128 in a range from the light input end 152 to the light output end 154 of the optical modulation element 102 along the length direction of the modulator housing 104. In addition, the thicknesses t51 and t52 of the parts not provided with pedestal part 160 in the bottom surface wall 128, that is, the bottom plate portions 162 and 164 refer to the average values of the thicknesses of the bottom surface wall 128 in the bottom plate portions 162 and 164, respectively, in a case where the bottom plate portions 162 and 164 have a protrusion and a recess.

Figure 15:
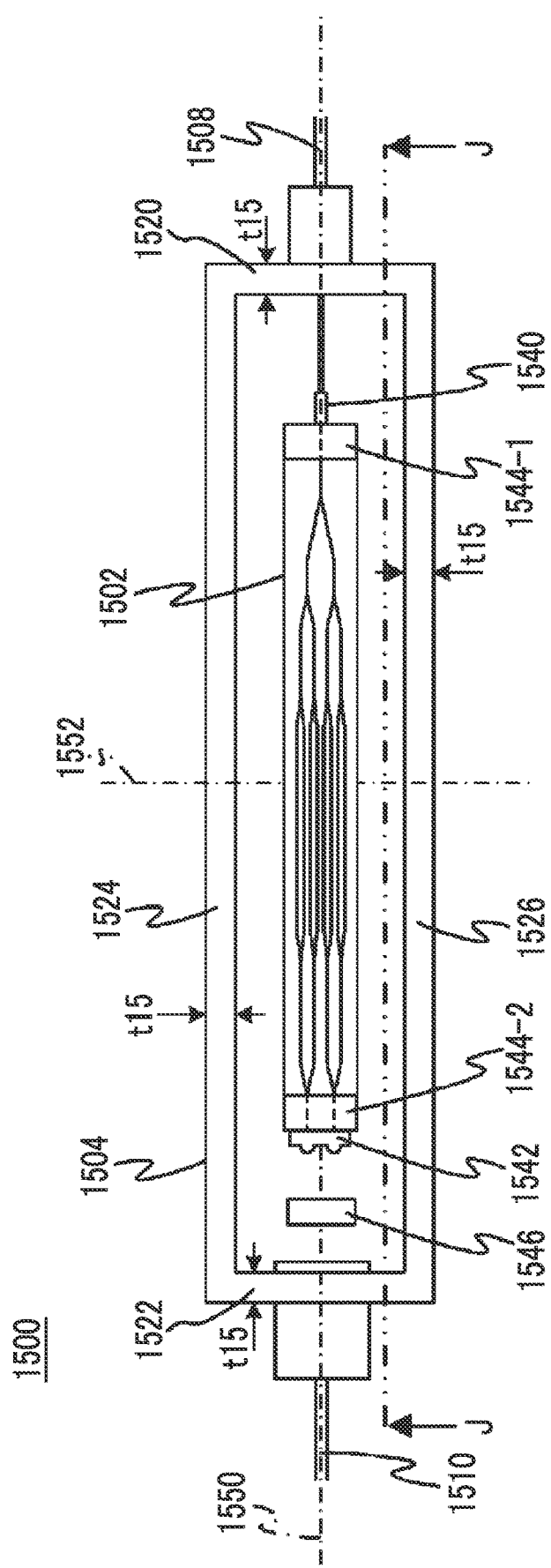
FIG. 15 is a plan view showing the configuration of a conventional optical modulator.
Figure 16:
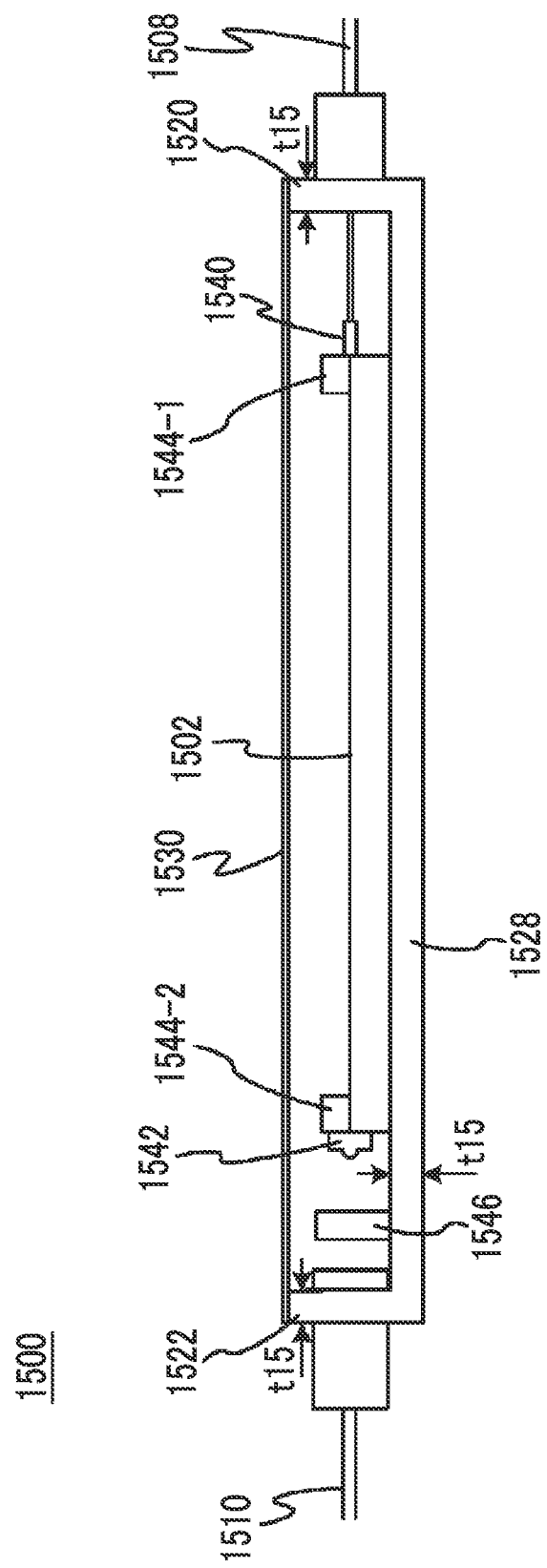
FIG. 16 is a cross-sectional view of a conventional optical modulator shown in FIG. 15 taken along the line JJ.
Figure 17:
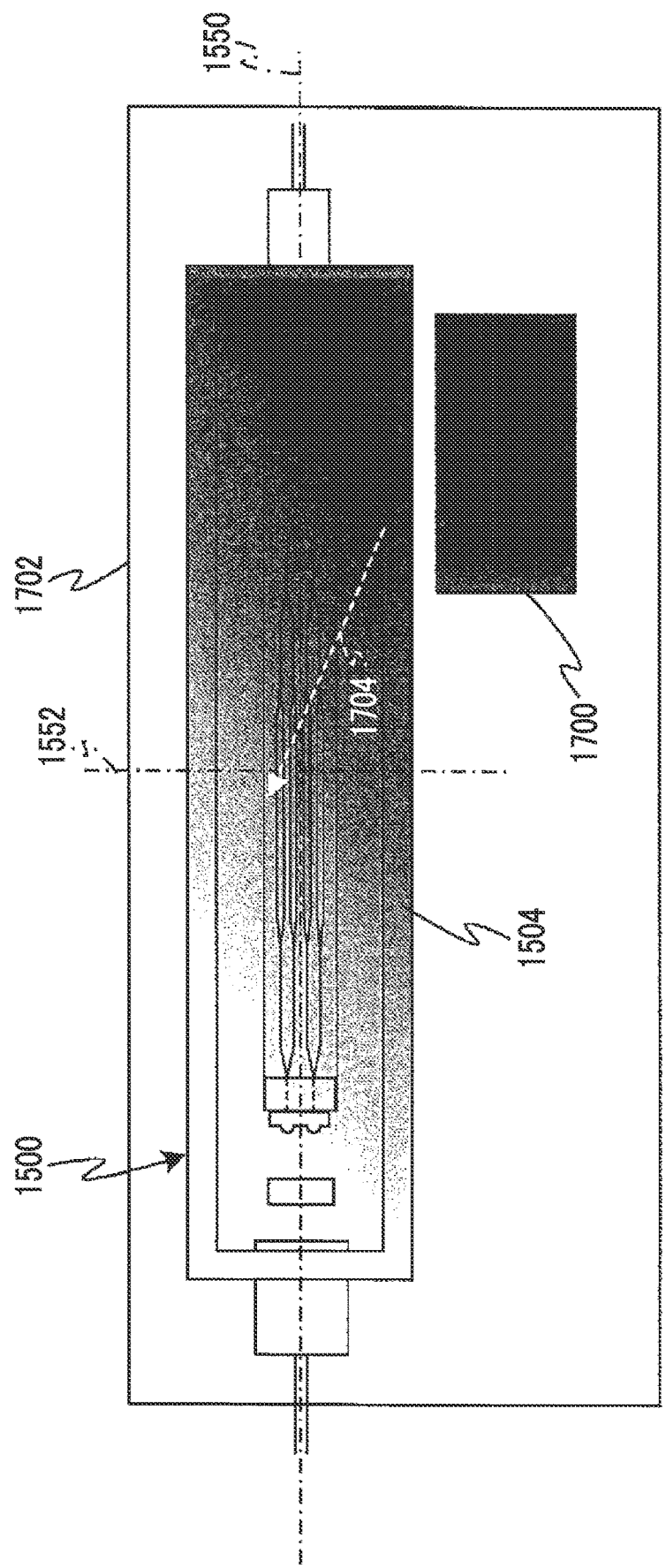
FIG. 17 is a view showing an example of a temperature distribution generated in a modulator housing in a case where the conventional optical modulator is mounted on a circuit board.

In the optical modulator 100 having the above-described configuration, the thermal resistance of the long side wall 126 along the long side of the modulator housing 104 is reduced by making the wall thickness t3 of the long side wall 126 thickest. Therefore, for example, in a case where the optical modulator 100 is mounted on a circuit board in an optical module, heat that flows from a DSP or the like, which is a heat-generating electronic part disposed on the long side wall 126 side, into a part of the modulator housing 104 through the circuit board or a space propagates along the long side wall 126 having the largest wall thickness faster than in conventional configurations. In addition, the propagating heat immediately flows out onto the circuit board. As a result, the temperature gradient in the length direction of the modulator housing 104 is reduced compared with those in conventional optical modulators (for example, the optical modulator 1500 shown in FIG. 15). In addition, the temperature gradient in the length direction of the modulator housing 104 is reduced, whereby the direction of the temperature gradient in the modulator housing 104 as a whole becomes a direction close to the length direction compared with the direction 1704 shown in FIG. 17.

That is, in the optical modulator 100, it is possible to generate a temperature gradient that is milder than conventional temperature gradients in the modulator housing 104 along the length direction of the modulator housing 104 even in a case where a heat-generating electronic part such as a DSP is disposed close to the optical modulator 100. Therefore, the symmetry of the temperature distribution with respect to the center line 132 with respect to the length direction and the center line 130 with respect to the width direction of the modulator housing 104 improves.

As a result, in a case where the optical modulator 100 is disposed close to a heat-generating electronic part, stress generated in the modulator housing 104 is reduced and dispersed. In addition, the symmetry of the temperature distribution in the modulator housing 104 improves, whereby the temperature distribution in the optical modulation element 102, which is an interference type optical modulator accommodated in the modulator housing 104, also becomes more symmetric. As a result, the optical path length change or phase change between parallel waveguides that configure Mach-Zehnder type optical waveguides in the optical modulation element 102 is significantly offset, and the characteristic variations (for example, an operating point variation) of the optical modulation element 102 is also suppressed.

Furthermore, in the present embodiment, the pedestal part 160 is provided on the bottom surface wall 128, and it is possible to make the thickness t4 of the pedestal part 160 thicker than the thicknesses t51 and t52 of the other parts of the bottom surface wall 128 (that is, the bottom plate portions 162 and 164). Therefore, not only are the relationships between the thickness t11 and t12 of the short side walls 120 and 122 and between the thicknesses t2 and t3 of the long side walls 124 and 126 set as described above, furthermore, but the thickness t4 of the pedestal part 160 is also adjusted, whereby it is possible to further improve heat conduction in the length direction of the modulator housing 104.

For example, the thickness t4 of the pedestal part 160 is set to be larger than the wall thickness t3 of the long side wall 126, that is, t4 is set such that t11<t2≤t3<t4 and t12<t2≤t3<t4 are satisfied, whereby it is possible to increase not only the above-described effect of reducing the temperature gradient in the length direction of the modulator housing 104 but also an effect of reducing the temperature gradient in the width direction of the modulator housing 104. As a result, it is possible to further increase an effect of improving the symmetry of the temperature distribution in the modulator housing 104. The present configuration is particularly effective for optical modulation elements having a Mach-Zehnder type optical waveguide, the optical path length change or phase change between parallel waveguides that configure the Mach-Zehnder type optical waveguide is significantly offset, and it is possible to further suppress the characteristic variations (for example, an operating point variation) of the optical modulation element 102.

In addition, in the present embodiment, in a case where it is possible to set the thickness t4 of the pedestal part 160 to be sufficiently large, regardless of the magnitude relationships between the thicknesses t11 and t12 of the short side walls 120 and 122 and between the thicknesses t2 and t3 of the long side walls 124 and 126, it is also possible to obtain the effect of reducing the temperature gradient in the length direction and in the width direction of the modulator housing 104 and the effect of improving the symmetry of the temperature distribution described above by ensuring the heat conduction amounts in the length direction and in the width direction of the modulator housing 104 with the pedestal part 160. That is, it is possible to realize the same effects as the above-described effects even by, for example, making the thickness t4 of the pedestal part 160 thicker than the thicknesses t11 and t12 of the short side walls 120 and 122 and the thicknesses t2 and t3 of the long side walls 124 and 126. In other words, when the thickness t4 of the pedestal part 160 is made thickest among the walls that configure the modulator housing 104, it is possible to obtain the above-described effects.

In addition, in the modulator housing 104 of the present embodiment, among the four sides shown in FIG. 1, the wall thickness t3 of the long side wall 126 is formed to be thickest, whereby the thermal resistance of the long side wall 126 along the long side of the modulator housing 104 is reduced. In addition, the stiffness of the modulator housing 104 is ensured mainly by the long side walls 124 and 126 and the bottom surface wall 128. Therefore, it is possible to thin the wall thicknesses t11 and t12 of the short side walls 120 and 122 compared with those in optical modulators in the related art, whereby it is possible to increase the thermal resistance of these walls. Therefore, it is possible to suppress the inflow of heat into the short side walls 120 and 122 to which an optical fiber 108 or the like, an optical component (polarization-combining part 145 or the like), or the like is fixed and the vicinities of the short side walls 120 and 122, which can be a cause for characteristic variations and/or the degradation of long-term reliability attributed to an increase in temperature, by satisfying $t11<t2\le t3$ and $t12<t2\le t3$ or $t11<t2\le t3<t4$ and $t12<t2\le t3<t4$ as described above without impairing the stiffness of the modulator housing 104.

Furthermore, in the present embodiment, the thicknesses t51 and t52 of the bottom plate portions 162 and 164 not provided with the pedestal part 160 in the bottom surface wall 128 are configured to be thin compared with the thickness t4 of the pedestal part 160, whereby the bottom plate portions 162 and 164 configure the highly thermal resistant portions. In addition, these highly thermal resistant portions are provided in the optical input portion 170 and the optical output portion 172, respectively. Therefore, heat that flows into the short side walls 120 and 122 and the vicinities thereof through the pedestal part 160 is more effectively suppressed, and the inflow of heat to the optical fiber 108 or the like and optical components that are fixed to the short side walls 120 and 122 is further suppressed.

As a result of what has been described above, in the optical modulator 100, it is possible to reduce characteristic variations and the degradation of long-term reliability by forming the temperature distribution in the modulator housing 104 in a more symmetric state even in a case where a heat-generating electronic part such as a DSP is disposed close to the optical modulator 100 in optical modules. In addition, as a result of the more symmetric temperature distribution state of the modulator housing 104, the modulator housing 104 in an optical module is more likely to be in a state of being placed in a uniform temperature environment as in a long-term reliability test in a constant-temperature bath. Therefore, the long-term reliability of the optical modulator 100 becomes similar to reliability prediction based on a reliability test using a constant-temperature bath, and it is possible to prevent the degradation of the reliability beyond the prediction.

It should be noted that the wall thickness t3, which is the average wall thickness, of the long side wall 126 is larger than a value of approximately 1.5 mm, which is the wall thickness t2 that is typically used in conventional optical modulators, to realize a lower thermal resistance than the thermal resistance of long side walls in conventional optical modulators and is desirably set in, for example, a range of values of 2.0 mm or more and 3.0 mm or less. In addition, when the mechanical strength of the modulator housing 104 is also taken into account, the wall thicknesses t11 and t12, which are the average wall thicknesses, of the short side walls 120 and 122, are desirably set in, for example, a range of values of 0.5 mm or more and 1.5 mm or less and more desirably set in a range of values of 0.5 mm or more and 1.0 mm or less such that the thermal resistance of the short side wall 120 and the short side wall 122 becomes a large value compared with the thermal resistance of the long side walls 124 and 126. In other words, the wall thicknesses t11 and t12 of the short side walls 120 and 122 are desirably ¾ or less and more desirably ½ or less of the wall thickness t3 of the long side walls 126.

For example, in the case of a configuration where the long side wall 126 has a protrusion and a recess, it is possible to form the long side wall 126 in a thickness range of 1.7 mm to 4 mm and to set the wall thickness t3, which is the average wall thickness, in a range of values of 2.0 mm or more and 3.0 mm or less. In addition, for example, in the case of a configuration where the short side wall 120 and the short side wall 122 have a protrusion and a recess, it is possible to form the short side wall 120 and the short side wall 122 in a thickness range of 0.3 mm to 1 mm, respectively, and to set the wall thicknesses t11 and t12, which are the average wall thicknesses, in a range of values of 0.5 mm or more and 1.0 mm or less, respectively.

In addition, the wall thickness t11 of the short side wall 120 and the wall thickness t12 of the short side wall 122 may be the same value or may be different values. Furthermore, both the wall thickness t11 of the short side wall 120 and the wall thickness t12 of the short side wall 122 do not necessarily need to be smaller values than the wall thickness t2 of the long side wall 124. For example, depending on the magnitude (sensitivity) of the influence of the temperature fluctuations of the short side walls 120 and 122 on the positional deviation and characteristic variations of the input optical fiber 108, the output optical fiber 110, the microlens array 142, the polarization-combining part 145, or the lens 146, it is possible to set at least one of t11 or t12 to a value smaller than the wall thickness t2.

It should be noted that, in the present embodiment, the bottom plate portions 162 and 164 have the thicknesses t51 and t52 thinner than the thickness t4 of the pedestal part 160 and thereby configure the highly thermal resistant portions, but the configuration is not limited thereto. The bottom plate portions 162 and 164 may configure the highly thermal resistant portions by being fully or partially made of a material having a lower thermal conductivity than the other parts of the modulator housing 104 (ceramics, a mold resin, or the like).

In addition, the highly thermal resistant portion may be formed not in both of the optical input portion 170 and the optical output portion 172 but in one of the optical input portion 170 and the optical output portion 172. That is, it is possible to form the region that is the highly thermal resistant portion in a region including a part or an entirety of the optical input portion 170 and/or the optical output portion 172. Specifically, the highly thermal resistant portion may be formed in an entirety of the optical input portion 170 and/or the optical output portion 172 or may extend outside the ranges of the optical input portion 170 and/or the optical output portion 172 including a part or an entirety of the optical input portion 170 and/or optical output portion 172. Furthermore, the highly thermal resistant portion needs to be formed in any (one or plural) portion on the bottom surface wall 128 in which the pedestal part 160 is not provided and may be formed outside the ranges of the optical input portion 170 and the optical output portion 172. Even in a case where the highly thermal resistant portion is formed outside the range of the optical input portion 170 and the optical output portion 172, it is possible to suppress heat that is conducted through the pedestal part 160 being conducted to other parts of the bottom surface wall 128 (for example, the short side walls 120 and/or 122). In addition, the highly thermal resistant portions may be formed in both or one of the optical input portion 170 and the optical output portion 172 and, furthermore, may be formed in a part other than the optical input portion 170 and the optical output portion 172 of the bottom surface wall 128.

Second Embodiment

Figure 4:
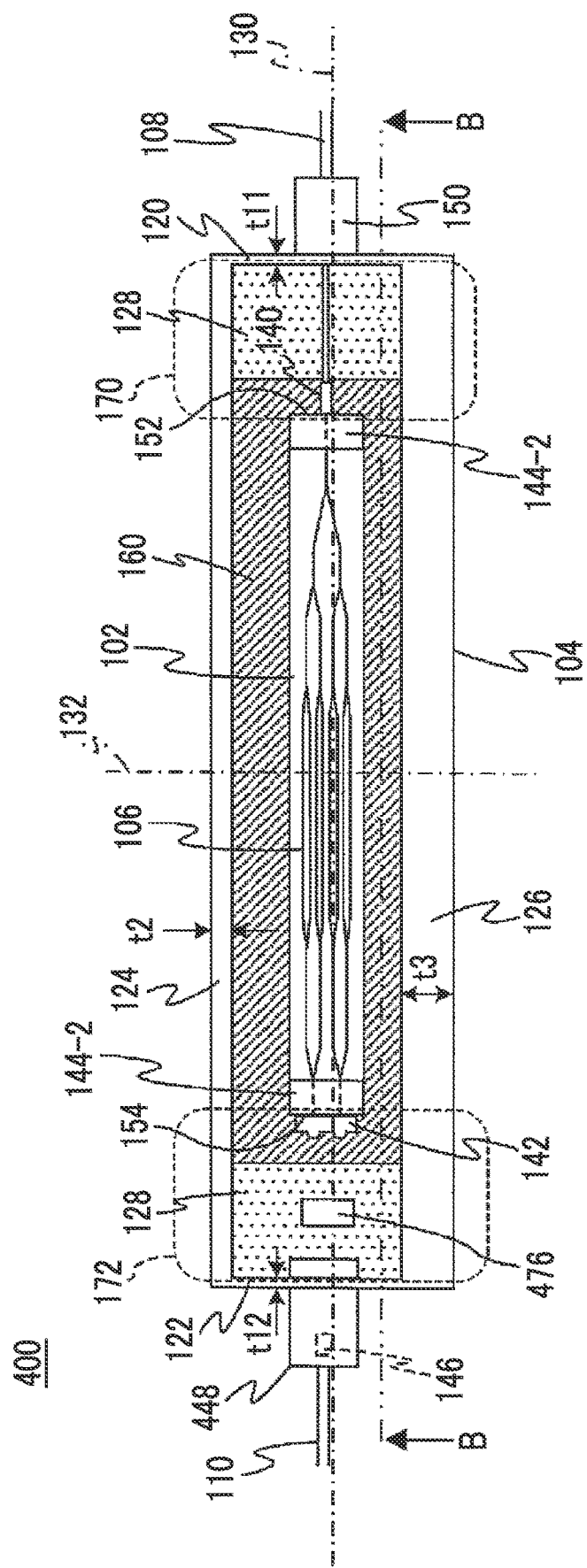
FIG. 4 is a plan view of an optical modulator according to a second embodiment of the present invention.
Figure 5:
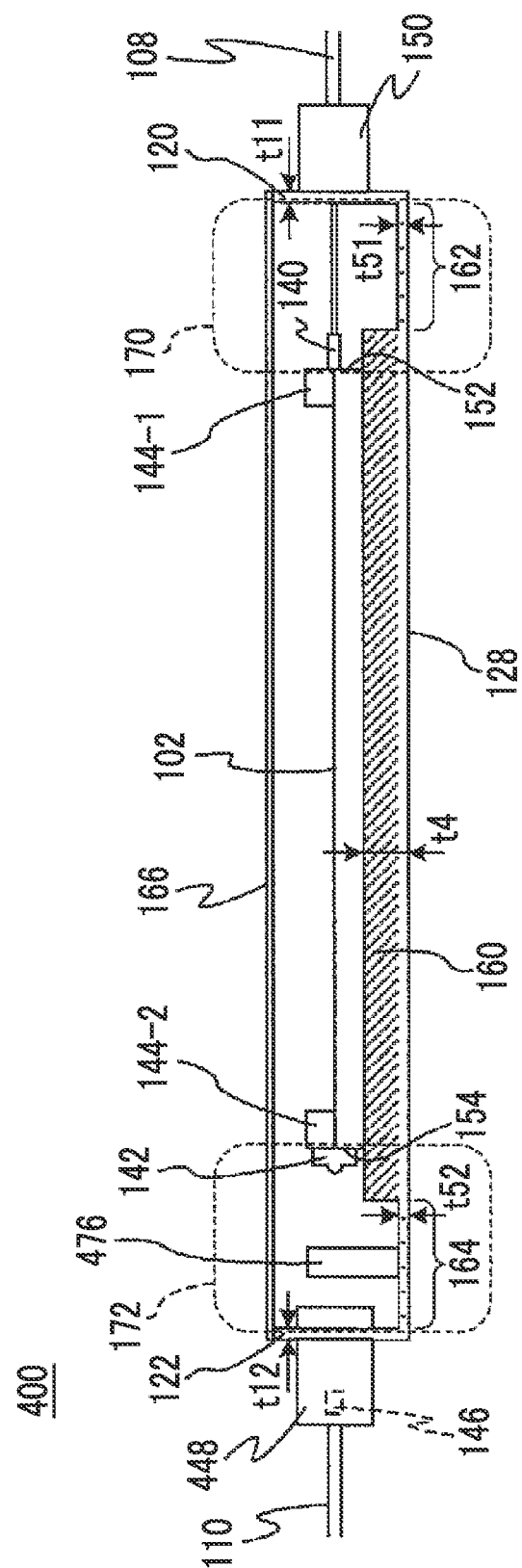
FIG. 5 is a cross-sectional view of the optical modulator shown in FIG. 4 taken along the line BB.

Next, a second embodiment of the present invention will be described. FIG. 4 is a plan view showing the configuration of an optical modulator 400 according to the second embodiment. In addition, FIG. 5 is a cross-sectional view of the optical modulator 400 shown in FIG. 4 taken along the line BB. In FIG. 4 and FIG. 5, for the same configuration element and wall thickness as in the optical modulator 100 according to the first embodiment in FIG. 1 and FIG. 3, the same reference sign as in FIG. 1 and FIG. 3 is used, and the description of the above-described optical modulator 100 will be incorporated. In addition, the side surface appearance of the optical modulator 400 is regarded as the same as the side surface appearance of the optical modulator 100 shown in FIG. 2. In addition, in FIG. 4, in order to facilitate the understanding of the configuration of the optical modulator 400, similar to FIG. 1, the internal structure, which cannot be observed in a state where the optical modulator 400 is completely assembled, is also indicated with solid lines.

The optical modulator 400 has the same configuration as the optical modulator 100 in the first embodiment, but is different in terms of the fact that a light output terminal portion 448 is provided instead of the light output terminal portion 148. The light output terminal portion 448 has the same configuration as the light output terminal portion 148, but is different in terms of the fact that the polarization-combining part 145 is not disposed. In addition, the optical modulator 400 is different from the optical modulator 100 in terms of the fact that an optical part 476 is disposed on the bottom plate portion 164 that configures the highly thermal resistant portion in the bottom surface wall 128 provided in the optical output portion 172. In the present embodiment, the optical part 476 includes, for example, the polarization-combining part 145 that is disposed in the light output terminal portion 148 of the optical modulator 100 of FIG. 1, which is the first embodiment.

Usually, the disposition of an optical component in the light output terminal portion is advantageous to the size reduction of optical modulators, but creates a number of restrictions on the size, shape, and/or characteristics of the optical component and limits choices of optical components. In addition, since the distance from a light output end surface of the optical modulation element to the optical component becomes long compared with a configuration where the optical component is disposed in the modulator housing, even in a case where the output angle of light output from the optical modulation element fluctuates due to a temperature fluctuation or the like, the input point of light in the optical component significantly fluctuates, and the temperature characteristic of optical characteristics is likely to become poor.

In contrast, in the optical modulator 400, since the optical part 476 is disposed on the bottom plate portion 164 in the bottom surface wall 128, the restrictions on the shape (size) or characteristics (for example, dependence on the light input point) of a polarization beam combining prism, a wave plate, or the like that configures the optical part 476 are mitigated. Therefore, the choices of these optical components are expanded. In addition, compared with a configuration in which the polarization-combining part 145 is disposed in the light output terminal portion 148, it becomes possible to decrease the distance from the light output end 154 of the optical modulation element 102 to the optical part 476. Therefore, it is also possible to suppress a change in optical characteristics caused by the fluctuation of the output angle of light from the optical modulation element 102 in association with the temperature fluctuation.

It should be noted that, in the optical part 476, one or a plurality of any optical components can be included depending on a function or the like required for the optical modulator 400. For example, the lens 146 that is disposed in the light output terminal portion 448 can also be included in the optical part 476 by drawing the output optical fiber 110 up to the inside of the modulator housing 104.

In addition, in the present embodiment, the optical part 476 is disposed on the bottom plate portion 164 that configures the highly thermal resistant portion in the optical output portion 172, but the configuration is not limited thereto. Instead of or in addition to this, an optical component may be disposed in the bottom plate portion 162 that configures the highly thermal resistant portion in the optical input portion 170. For example, a space optical system in which the input optical fiber 108 and the optical modulation element 102 are optically coupled using a lens may be formed, and the lens, which is an optical component, may be disposed on the bottom plate portion 162 in the optical input portion 170.

Third Embodiment

Figure 6:
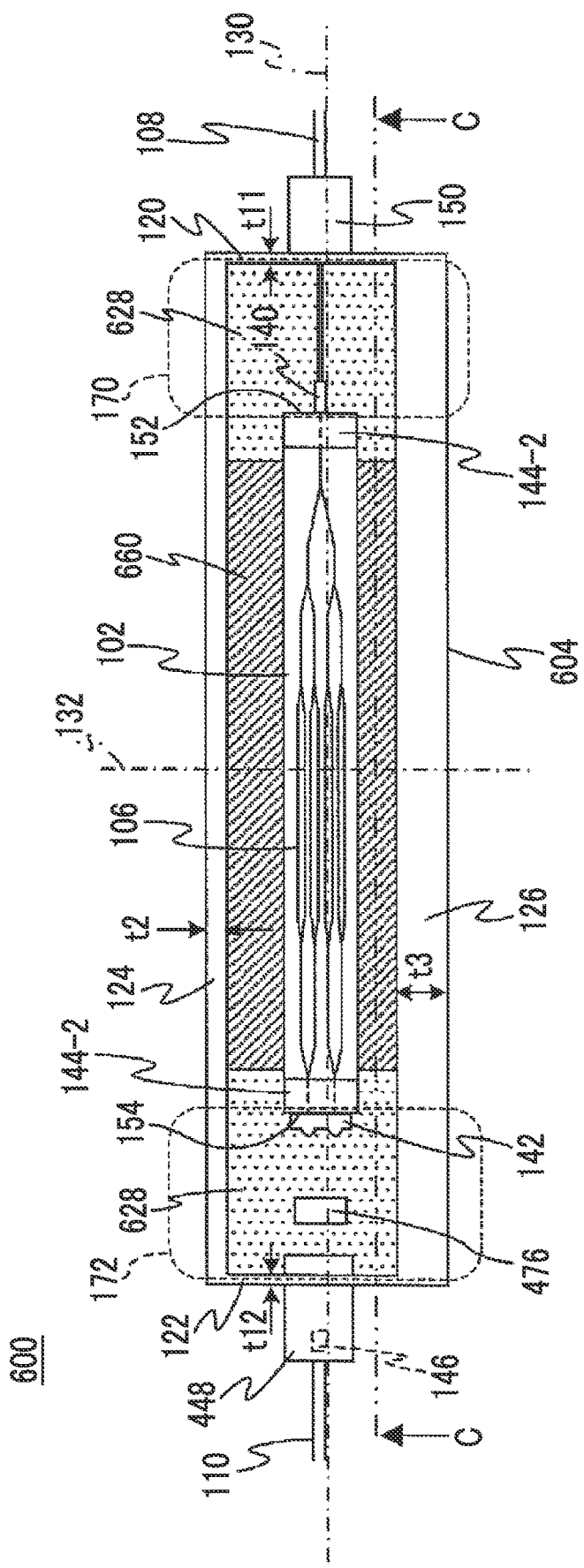
FIG. 6 is a plan view of an optical modulator according to a third embodiment of the present invention.
Figure 7:
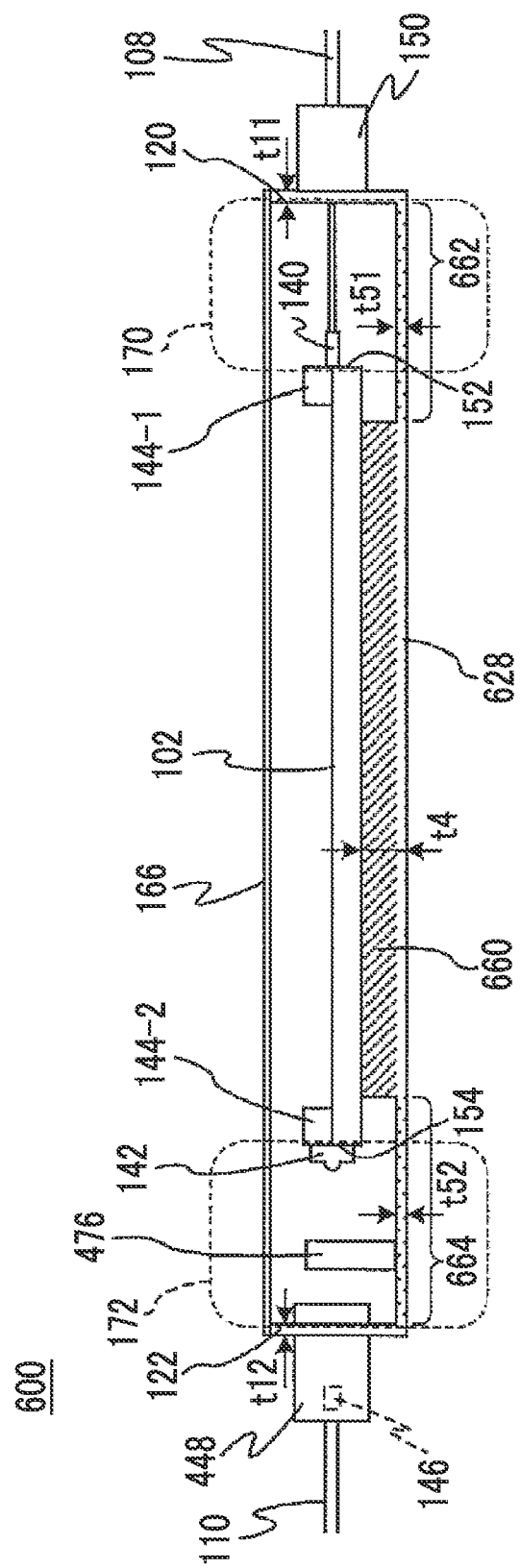
FIG. 7 is a cross-sectional view of the optical modulator shown in FIG. 6 taken along the line CC.

Next, a third embodiment of the present invention will be described. FIG. 6 is a plan view showing the configuration of an optical modulator 600 according to the third embodiment. In addition, FIG. 7 is a cross-sectional view of the optical modulator 600 shown in FIG. 6 taken along the line CC. In FIG. 6 and FIG. 7, for the same configuration element and wall thickness as in the optical modulators 100 and 400 according to the first and second embodiments in FIG. 1, FIG. 2, FIG. 3, FIG. 4, and FIG. 5, the same reference sign as in FIG. 1, FIG. 2, FIG. 3, FIG. 4, and FIG. 5 is used, and the description of the above-described optical modulators 100 and 400 will be incorporated. In addition, the side surface appearance of the optical modulator 600 is regarded as the same as the side surface appearance of the optical modulator 100 shown in FIG. 2. In addition, in FIG. 6, in order to facilitate the understanding of the configuration of the optical modulator 600, similar to FIG. 1, the internal structure, which cannot be observed in a state where the optical modulator 600 is completely assembled, is also indicated with solid lines.

The optical modulator 600 has the same configuration as the optical modulator 400 in the second embodiment, but is different in terms of the fact that a modulator housing 604 is provided instead of the modulator housing 104. The modulator housing 604 has the same configuration as the modulator housing 104, but is different in terms of the fact that a bottom surface wall 628 is provided instead of the bottom surface wall 128. The bottom surface wall 628 has the same configuration as the bottom surface wall 128, but is different in terms of the fact that a pedestal part 660 is provided instead of the pedestal part 160.

The pedestal part 660 has the same configuration as the pedestal part 160, but the length in the length direction of the modulator housing 604 is configured to be shorter than the length in the length direction of the modulator housing 104 of the pedestal part 160. In addition, in the optical modulator 600, the light input end 152 and light output end 154 of the optical modulation element 102 are disposed on the pedestal part 660 so as to protrude outside the range of the pedestal part 660. That is, in the optical modulator 600, the microlens array 142 and the capillary 140, which are optical components provided in the light input end 152 and the light output end 154 of the optical modulation element 102, respectively, are disposed outside the range of the pedestal part 660 so as not to be in contact with the pedestal part 660. It should be noted that the optical components that are provided in the light input end 152 and the light output end 154, respectively, are not limited to the microlens array 142 and the capillary 140 and can be any optical component depending on a function required for the optical modulator 600.

In addition, in the optical modulator 600, bottom plate portions 662 and 664 of the bottom surface wall 628 in which the pedestal part 660 is not provided are formed in the thicknesses t51 and t52 that are thinner than the thickness t4 of the pedestal part 660, respectively. Therefore, the bottom plate portions 662 and 664 configure highly thermal resistant portions having higher thermal resistance than the part in which the pedestal part 660 is formed in the parts of the bottom surface wall 628 portion including the optical input portion 170 and the optical output portion 172, respectively.

It should be noted that, in the present configuration, the definitions of the thickness t4 of the pedestal part 660 and the thicknesses t51 and t52 of the bottom plate portions 662 and 664 are regarded as the same as the definitions of the thicknesses of the pedestal part 160 and the bottom plate portions 162 and 164 described above. In addition, the definition of the average value of each thickness in a case where the pedestal part 660 and/or the bottom plate portions 662 and 664 have a protrusion and a recess is also regarded as the same as the definition regarding the pedestal part 160 and the bottom plate portions 162 and 164 described above.

In the optical modulator 600 having the above-described configuration, since the light input end 152 and light output end 154 of the optical modulation device 102 protrudes outside the range of the pedestal part 660 and are disposed on the pedestal part 660 so as not to be in contact with the pedestal part 660, the inflow of heat to the optical components such as the capillary 140 disposed in the light input end 152 and the microlens array 142 disposed in the light output end is also suppressed. Therefore, in the optical modulator 600, even in a case where a heat-generating electronic part is disposed near the optical modulator 600, it is possible to suppress the inflow of heat to a variety of optical components in the modulator housing 604, including the capillary 140 and the microlens array 142, while effectively thermally conducting heat from the heat-generating electronic part to the entire optical modulation element 102. As a result, in the optical modulator 600, it is possible to realize more stable characteristics and higher reliability by further reducing the influence of heat from the heat-generating electronic part on optical characteristics and long-term reliability.

Fourth Embodiment

Figure 8:
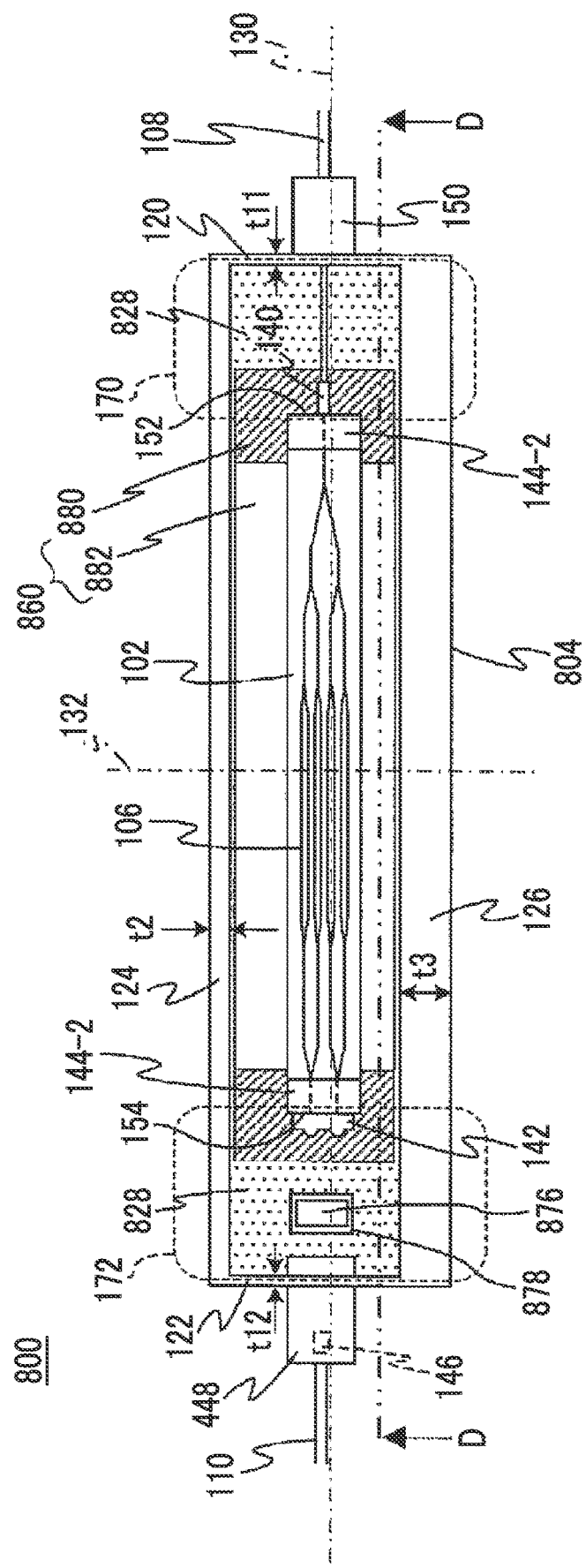
FIG. 8 is a plan view of an optical modulator according to a fourth embodiment of the present invention.
Figure 9:
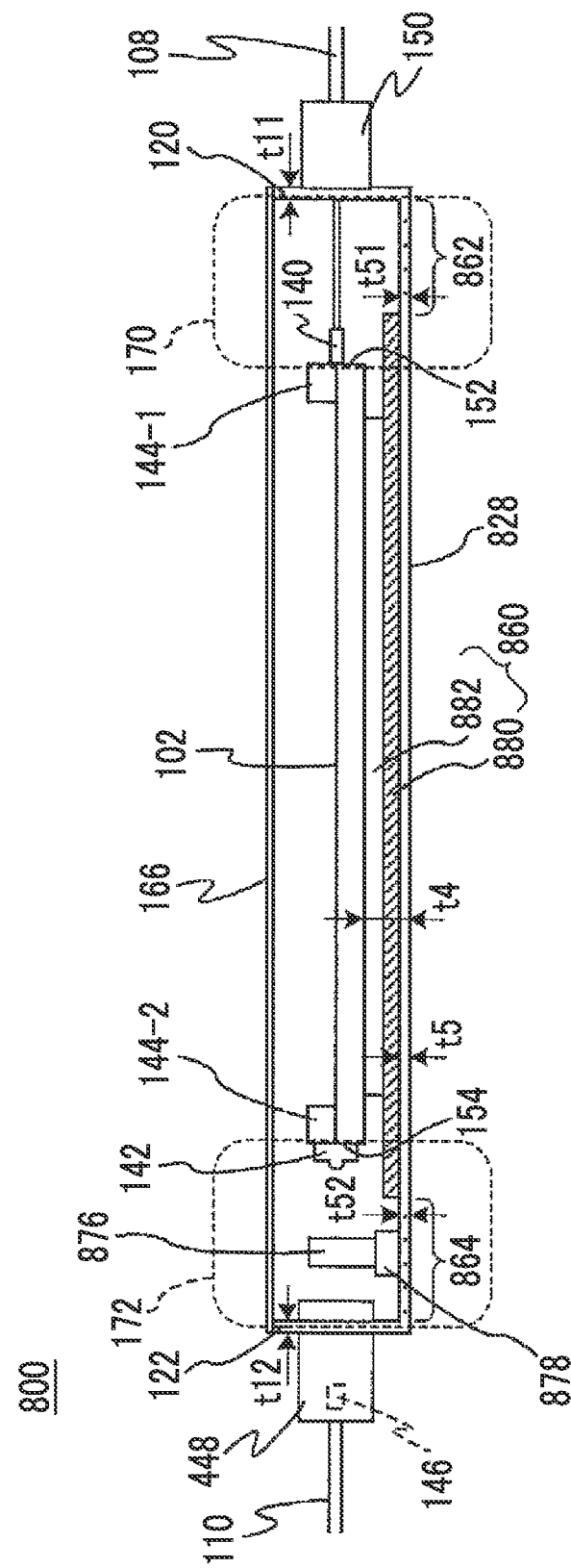
FIG. 9 is a cross-sectional view of the optical modulator shown in FIG. 8 taken along the line DD.

Next, a fourth embodiment of the present invention will be described. FIG. 8 is a plan view showing the configuration of an optical modulator 800 according to the fourth embodiment. In addition, FIG. 9 is a cross-sectional view of the optical modulator 800 shown in FIG. 8 taken along the line DD. In FIG. 8 and FIG. 9, for the same configuration element and wall thickness as in the optical modulator 600 according to the third embodiment in FIG. 6 and FIG. 7, the same reference sign as in FIG. 6 and FIG. 7 is used, and the description of the above-described optical modulator 600 will be incorporated. In addition, the side surface appearance of the optical modulator 800 is regarded as the same as the side surface appearance of the optical modulator 100 shown in FIG. 2. In addition, in FIG. 8, in order to facilitate the understanding of the configuration of the optical modulator 800, similar to FIG. 1, the internal structure, which cannot be observed in a state where the optical modulator 800 is completely assembled, is also indicated with solid lines.

The optical modulator 800 has the same configuration as the optical modulator 600 in the third embodiment, but is different in terms of the fact that a modulator housing 804 is provided instead of the modulator housing 604. The modulator housing 804 has the same configuration as the modulator housing 604, but is different in terms of the fact that a bottom surface wall 828 is provided instead of the bottom surface wall 628. Unlike the bottom surface wall 628, the bottom surface wall 828 does not include the pedestal part 660 formed therein and is configured as a wall having a uniform thickness (or average thickness) t5.

In addition, in the optical modulator 800, a first spacer 880 (diagonally hatched part in the drawing) that is a plate-like body disposed on the bottom surface wall 828 and a second spacer 882 that is a plate-like body disposed on the first spacer 880 configure the pedestal part 860. On the pedestal part 860, similar to the pedestal part 660, the optical modulation element 102 is disposed.

In the present embodiment, the first spacer 880 and the second spacer 882, which are plate-like bodies, are made of, for example, Kovar, SUS, or the like which is the same material as the modulator housing 804. However, the configuration is not limited thereto, and the first spacer 880 and the second spacer 882 may be made of a material different from the modulator housing 804, respectively.

Particularly, in the present embodiment, the length along the modulator housing 804 of the second spacer 882 in which the optical modulation element 102 is disposed is, similar to the pedestal part 660 in the optical modulator 600, configured to be shorter than the distance from the light input end 152 to the light output end 154 of the optical modulation element 102. In addition, the optical modulation element 102 is disposed such that the light input end 152 and the light output end 154 protrude from the upper surface (the white surface shown in FIG. 8) of the second spacer 882, respectively.

That is, in the optical modulator 800, similar to the optical modulator 600, the microlens array 142 and the capillary 140, which are optical components provided in the light input end 152 and the light output end 154 of the optical modulation element 102, respectively, are disposed outside the range of the upper surface of the second spacer 882. It should be noted that the optical components that are provided in the light input end 152 and the light output end 154, respectively, are not limited to the microlens array 142 and the capillary 140 and can be any optical component depending on a function required for the optical modulator 600.

In addition, the length along the modulator housing 804 of the first spacer 880 that is disposed between the bottom surface wall 828 and the second spacer 882 is configured to be longer than the length of the second spacer 882. In addition, the second spacer 882 is disposed within the range of the upper surface of the first spacer 880. The bottom surface wall 828 and the first spacer 880, and the first spacer 880 and the second spacer 882 can be fixed by any method such as adhesion, soldering, or brazing.

In addition, in the bottom surface wall 828, bottom plate portions 862 and 864 in which the first spacer 880 is not disposed have the thicknesses t51 and t52, respectively, whereby highly thermal resistant portions having higher thermal resistance than a part made up of the second spacer 882, the first spacer 880, and the part of the bottom surface wall 828 below the second spacer 882 and the first spacer 880 are configured in the optical input portion 170 and the optical output portion 172.

Here, the thickness t4 of the pedestal part 860 refers to the distance from the upper surface of the second spacer 882 to the outer surface of the bottom surface wall 828, and, when there is a protrusion and a recess on the upper surface of the second spacer 882, the thickness t4 is regarded as referring to the average value of the distance from the upper surface of the second spacer 882 to the outer surface of the bottom surface wall 828 in the range from the light input end 152 to the light output end 154 of the optical modulation element 102. In addition, the thicknesses t51 and t52 of the bottom plate portions 862 and 864 are the same as the thickness t5 of the bottom surface wall 828 or are regarded as referring to the average thickness in the bottom plate portions 862 and 864 in a case where the bottom plate portions 862 and 864 have a protrusion and a recess.

Furthermore, in the optical modulator 800, an optical part 876 is provided instead of the optical part 476. However, unlike the optical modulators 400 and 600, the optical part 876 is not directly fixed to the bottom surface wall 828, but is fixed to the bottom surface wall 828 through a base part 878.

In the optical modulator 800 having the above-described configuration, the light input end 152 and the light output end 154 of the optical modulation element 102 protrude from the pedestal part 860 (more specifically, the second spacer 882), whereby, similar to the optical modulator 600, it is possible to suppress the inflow of heat to the optical components disposed in the light input end 152 and the light output end 154 (the capillary 140 and the microlens array 142 in the present embodiment). In addition, since the pedestal part 860 has a two-stage configuration made up of the first spacer 880 and the second spacer 882, and the length of the first spacer 880 is configured to be longer than the second spacer 882, compared with the optical modulator 600, in which the entire pedestal part 660 is configured to be shorter than the optical modulation element 102, it is possible to make thermal conductivity in the vicinity of the pedestal part 860 more favorable.

In addition, the pedestal part 860 is formed of the first spacer 880 and the second spacer 882, whereby it is possible to separately adjust the stiffness and thermal conductivity of the portion formed of the pedestal part 860 in the modulator housing 804 and the suppression of thermal conduction to the optical modulation element 102.

That is, it is possible to adjust the thermal conduction of the portion where the pedestal part 860 is formed and to adjust the stiffness of the bottom surface wall 828 portion by adjusting the length and thickness of the first spacer 880. In addition, it is also possible to adjust the suppression of thermal conduction to the optical modulation element 102 by adjusting the length and thickness of the second spacer 882.

It should be noted that, in terms of suppressing thermal conduction to the optical modulation element 102, a material having lower thermal conductivity than the material of the modulator housing 804, for example, an epoxy-based adhesive or the like is desirably used between the second spacer 882 and the first spacer 880 rather than a paste containing a metal-based brazing material or a metal filler or the like.

In addition, in the optical modulator 800, since the optical part 876 is fixed to the bottom surface wall 828 through the base part 878, two joining layers are interposed between the optical part 876 and the bottom surface wall 828, and it becomes possible to significantly suppress thermal conduction to the optical part 876. Furthermore, in a case where the optical part 876 is made up of a plurality of optical components, since it is possible to integrate and mount these optical components on the base part 878, it is possible to reduce the manufacturing man-hours and to effectively suppress manufacturing variations in terms of characteristics and/or reliability.

Here, from the viewpoint of suppressing thermal conduction to the optical part 876, the optical components that configure the optical part 876 and the base part 878 are desirably fixed with an adhesive having lower thermal conductivity than the material of the modulator housing 804, for example, an epoxy-based adhesive. In addition, the material of the base part 878 may be the same as the material of the modulator housing 804, but a material having lower thermal conductivity such as a ceramic substrate is more preferred.

It should be noted that, instead of or in addition to the optical part 876, another optical part made up of one or a plurality of optical components may be disposed on the bottom plate portion 862, which is a highly thermal resistant portion configured in the optical input portion 170, through the same base part as the base part 878.

In addition, as a first modification example of the present embodiment, instead of the first spacer 880 and the second spacer 882, the above-described first spacer 880 and second spacer 882 may be integrally formed with the modulator housing 804. For example, at the time of processing the modulator housing 804, the bottom surface wall 828 may be processed such that the same level difference as the level difference that is formed by the first spacer 880 and the second spacer 882 is formed. In this case, it is possible to further increase the stiffness of the bottom surface wall 828 of the modulator housing 804.

In addition, as a second modification example of the present embodiment, instead of the first spacer 880, a protrusion part having the same shape as the first spacer 880 may be formed on the bottom surface wall 828, and a separate second spacer 882 may be disposed on the upper surface of the protrusion part. In this case, it is possible to adjust the suppression of thermal conduction to the optical modulation element 102 by adjusting the length of the second spacer 882 while increasing the stiffness of the bottom surface wall 828.

In addition, as a third modification example of the present embodiment, the second spacer 882 may be made of a material that is different from the modulator housing 804 and has lower thermal conductivity than the modulator housing 804. Therefore, it is possible to more effectively suppress thermal conduction to the optical modulation element 102. In this case, when the second spacer 882 and the first spacer 880 are joined using a material having lower thermal conductivity than the modulator housing 804, for example, an epoxy-based adhesive or the like rather than a metal-based brazing material, a paste containing a metal filler, or the like, it is possible to further suppress thermal conduction to the optical modulation element 102. In addition, in this case, the thermal conductivity of the first spacer 880 is desirably larger than the thermal conductivity of the second spacer 882. In addition, from the viewpoint of suppressing the thermal gradient of the modulator housing 804, the thermal conductivity of the first spacer 880 is more desirably made larger than the thermal conductivity of the second spacer 882, and furthermore, made equal to or larger than the thermal conductivity of the material of the modulator housing 804. Furthermore, in the case of the present modification example, similar to the above-described second modification example, the first spacer 880 may be integrally formed with the bottom surface wall 828 of the modulator housing 804. In addition, from the viewpoint of suppressing the thermal gradient of the modulator housing 804, the length along the modulator housing 804 of the first spacer 880 in FIG. 9 is more preferably made longer than the length of the second spacer 882 and also made longer than the length of the optical modulation element 102.

It should be noted that, in the present embodiment, the bottom plate portions 862 and 864 configure the highly thermal resistant portions having higher thermal resistance than the other parts of the bottom surface wall 828 due to the fact that the first spacer 880 and the like are not disposed, but the configuration is not limited thereto. The bottom plate portions 862 and 864 may configure the highly thermal resistant portions by being fully or partially made of a material having lower thermal conductivity than the other parts of the modulator housing 804.

In addition, the highly thermal resistant portion may be formed not in both of the optical input portion 170 and the optical output portion 172 but in one of the optical input portion 170 and the optical output portion 172. That is, it is possible to form the region that is the highly thermal resistant portion in a region including a part or an entirety of the optical input portion 170 and/or the optical output portion 172. Specifically, the highly thermal resistant portion may be formed in an entirety of the optical input portion 170 and/or the optical output portion 172 or may extend outside the ranges of the optical input portion 170 and/or the optical output portion 172 including a part or an entirety of the optical input portion 170 and/or optical output portion 172. Furthermore, the highly thermal resistant portion needs to be formed in any (one or plural) portion on the bottom surface wall 828 in which the first spacer 880 is not disposed and may be formed outside the ranges of the optical input portion 170 and the optical output portion 172. Even in a case where the highly thermal resistant portion is formed outside the range of the optical input portion 170 and the optical output portion 172, it is possible to suppress heat that is conducted through the pedestal part 860 being conducted to other parts of the bottom surface wall 828 (for example, the short side walls 120 and/or 122). In addition, the highly thermal resistant portions may be formed in both or one of the optical input portion 170 and the optical output portion 172 and, furthermore, may be formed in a part other than the optical input portion 170 and the optical output portion 172 of the bottom surface wall 828.

Fifth Embodiment

Figure 10:
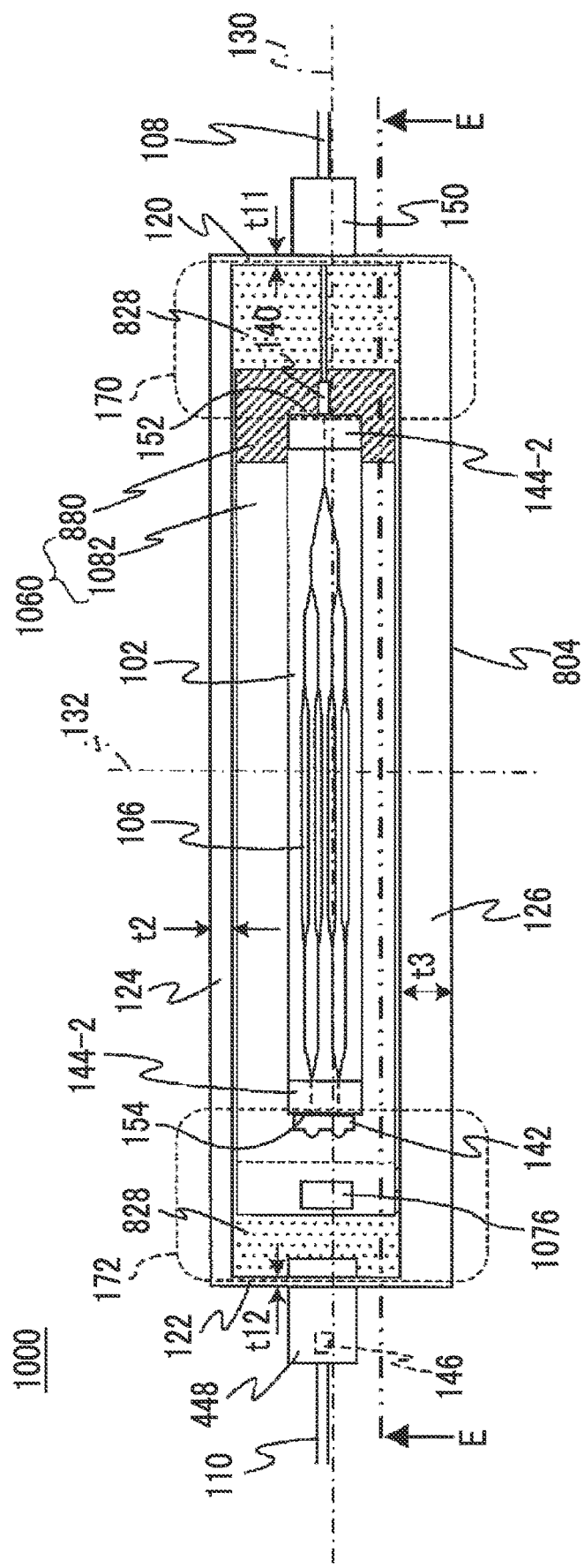
FIG. 10 is a plan view of an optical modulator according to a fifth embodiment of the present invention.
Figure 11:
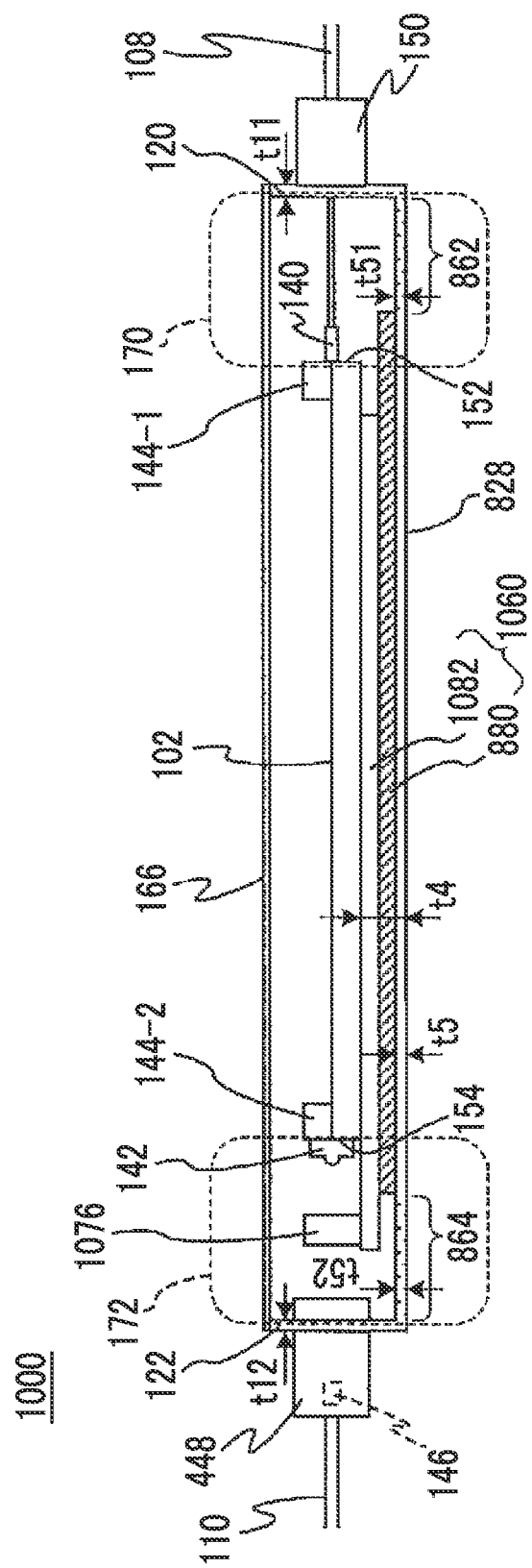
FIG. 11 is a cross-sectional view of the optical modulator shown in FIG. 10 taken along the line EE.

Next, a fifth embodiment of the present invention will be described. FIG. 10 is a plan view showing the configuration of an optical modulator 1000 according to the fifth embodiment. In addition, FIG. 11 is a cross-sectional view of the optical modulator 1000 shown in FIG. 10 taken along the line EE. In FIG. 10 and FIG. 11, for the same configuration element and wall thickness as in the optical modulator 800 according to the fourth embodiment in FIG. 8 and FIG. 9, the same reference sign as in FIG. 8 and FIG. 9 is used, and the description of the above-described optical modulator 800 will be incorporated. In addition, the side surface appearance of the optical modulator 1000 is the same as the side surface appearance of the optical modulator 100 shown in FIG. 2. In addition, in FIG. 10, in order to facilitate the understanding of the configuration of the optical modulator 1000, similar to FIG. 1, the internal structure, which cannot be observed in a state where the optical modulator 1000 is completely assembled, is also indicated with solid lines.

The optical modulator 1000 has the same configuration as the optical modulator 800 in the fourth embodiment, but is different in terms of the fact that a pedestal part 1060 is provided instead of the pedestal part 860. The pedestal part 1060 has the same configuration as the pedestal part 860, but is different in terms of the fact that a second spacer 1082 is provided instead of the second spacer 882. The second spacer 1082 is the same as the second spacer 882, but is different in terms of the fact that the end part of the optical modulation element 102 on the light output end 154 side extends beyond the position of the light output end 154 toward the short side wall 122.

In addition, the optical modulator 1000 has an optical part 1076 instead of the optical part 876, and the optical part 1076 is disposed on the upper surface (surface shown in FIG. 10) of a part in the second spacer 1082 that extends from the light output end 154 toward the short side wall 122.

Here, the thickness t4 of the pedestal part 1060 refers to the distance from the upper surface of the second spacer 1082 to the outer surface of the bottom surface wall 828, and, when there is a protrusion and a recess on the upper surface of the second spacer 1082, the thickness t4 is regarded as referring to the average value of the distance from the upper surface of the second spacer 1082 to the outer surface of the bottom surface wall 828 in the range from the light input end 152 to the light output end 154 of the optical modulation element 102.

In the optical modulator 1000 having the above-described configuration, the second spacer 882 is also configured to play the role of the base part 878 in the optical modulator 800. Similar to the base part 878, the second spacer 1082 is more preferably a material having lower thermal conductivity than the material of the modulator housing 804 such as a ceramic substrate.

Usually, in the case of mounting an optical modulator in an optical module, the majority of heat from an electronic component that is disposed near the optical modulator is transmitted through a circuit substrate and conducted from the bottom surface wall of a modulator housing. Therefore, in the configuration of the optical modulator 800 in which the optical part 876 is disposed on the bottom surface wall 828, there can be a case where it is not possible to sufficiently suppress thermal conduction to the optical component. In contrast, in the optical modulator 1000, since the optical part 1076 is disposed not on the bottom surface wall 828 but on the second spacer 1082 fixed onto the first spacer 880, it is possible to further suppress heat that has flowed into the modulator housing 804 being conducted to the optical part 1076.

The thermal resistance of an optical component is diverse, including a materials that is used to fix the optical component, and, in a case where it is intended to configure the optical part 1076 using an optical components having lower thermal resistance, the configuration of the optical modulator 1000 is particularly effective in terms of suppressing thermal conduction to the optical component.

In addition, in the optical modulator 1000, it is possible to assemble the optical part 1076 and the optical modulation element 102 on the second spacer 1082 in advance and then mount the optical part 1076 and the optical modulation element 102 on the modulator housing 804. Therefore, the optical modulator 1000 also has an advantage of simplifying the manufacturing process and enabling the stabilization of the optical characteristics.

It should be noted that, as a modification example of the present embodiment, similar to the optical modulator 800 of the fourth embodiment, the modulator housing 804 may be configured by forming the first spacer 880 as a part of the bottom surface wall 828.

Sixth Embodiment

Figure 12:
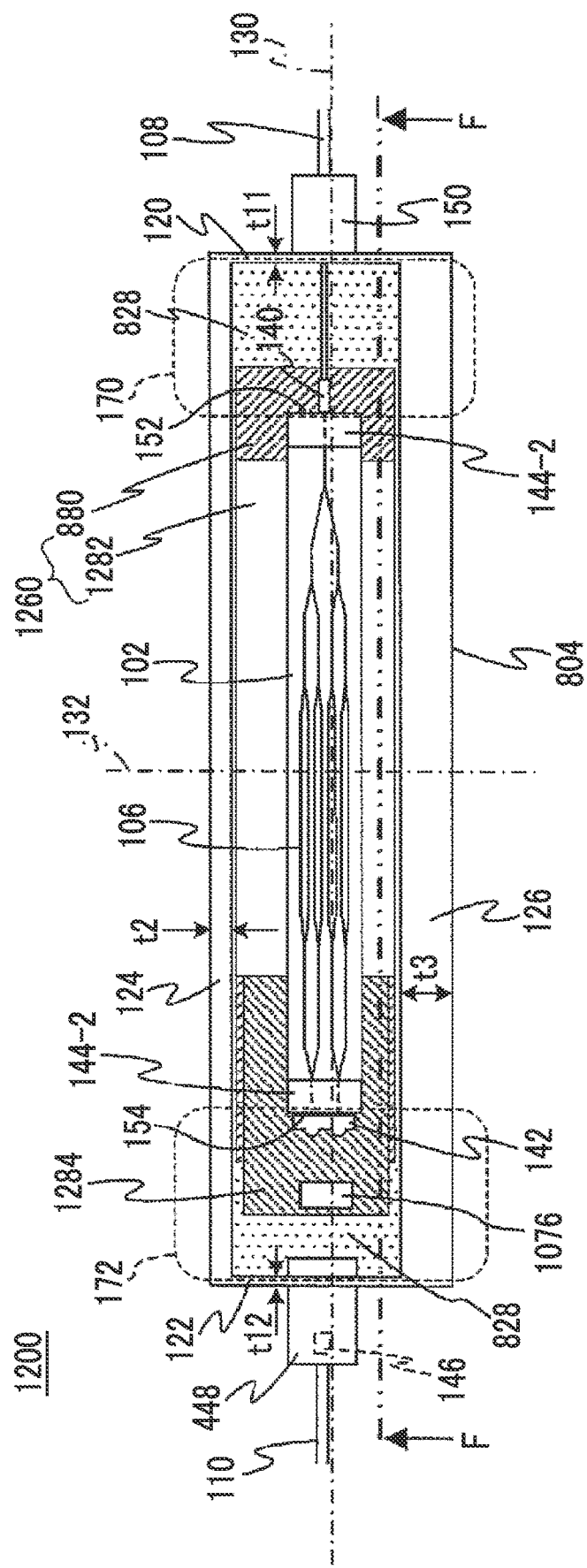
FIG. 12 is a plan view of an optical modulator according to a sixth embodiment of the present invention.
Figure 13:
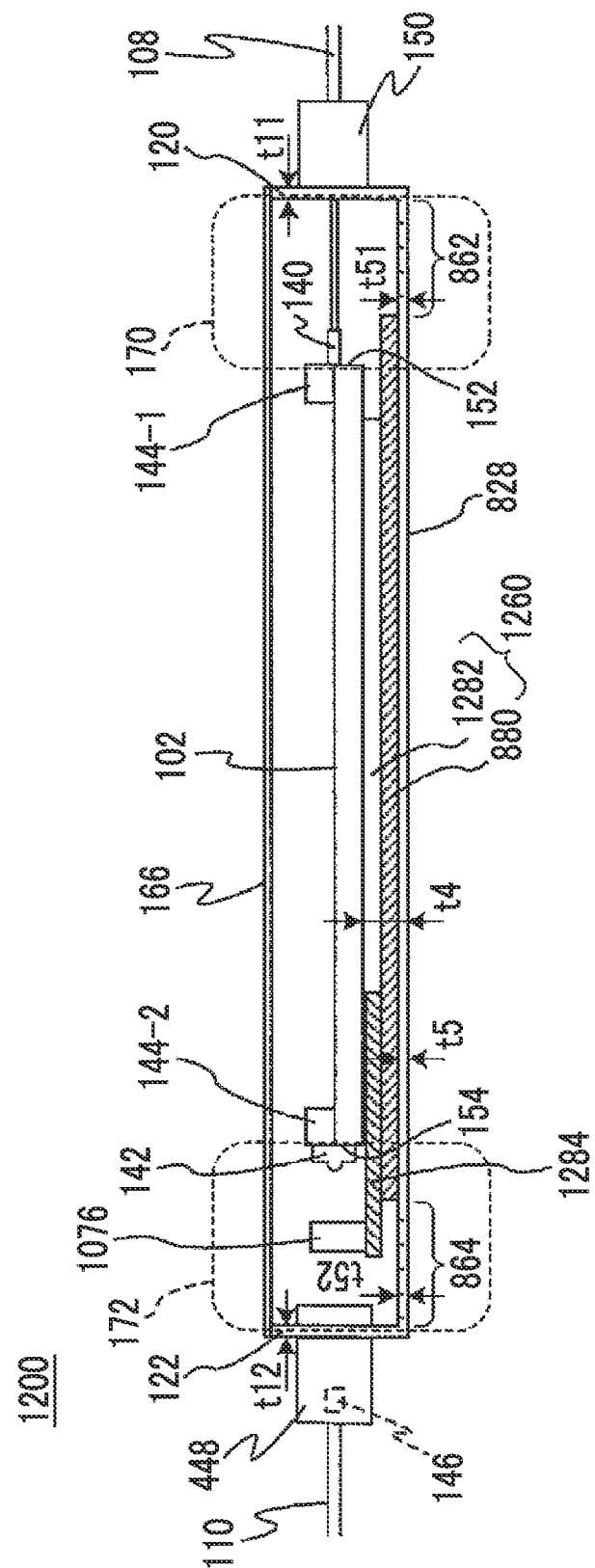
FIG. 13 is a cross-sectional view of the optical modulator shown in FIG. 12 taken along the line FF.

Next, a sixth embodiment of the present invention will be described. FIG. 12 is a plan view showing the configuration of an optical modulator 1200 according to the sixth embodiment of the present invention. In addition, FIG. 13 is a cross-sectional view of the optical modulator 1000 shown in FIG. 12 taken along the line FF. In FIG. 12 and FIG. 13, for the same configuration element and wall thickness as in the optical modulator 1000 according to the fifth embodiment in FIG. 10 and FIG. 11, the same reference sign as in FIG. 10 and FIG. 11 is used, and the description of the above-described optical modulator 1000 will be incorporated. In addition, the side surface appearance of the optical modulator 1200 is the same as the side surface appearance of the optical modulator 100 shown in FIG. 2. In addition, in FIG. 12, in order to facilitate the understanding of the configuration of the optical modulator 1200, similar to FIG. 1, the internal structure, which cannot be observed in a state where the optical modulator 1200 is completely assembled, is also indicated with solid lines.

The optical modulator 1200 has the same configuration as the optical modulator 1000 in the fifth embodiment, but is different in terms of the fact that a pedestal part 1260 is provided instead of the pedestal part 1060. The pedestal part 1260 has the same configuration as the pedestal part 1060, but is different in terms of the fact that a second spacer 1282 is provided instead of the second spacer 1082. The second spacer 1282 is the same as the second spacer 1082, but is configured to have a length that is shorter than the length of the optical modulation element 102. In addition, the optical modulation element 102 is disposed such that the light input end 152 and the light output end 154 protrude from the respective ends of the second spacer 1082.

Furthermore, on the upper surface of the first spacer 880, not only the second spacer 1282 but also a base part 1284 extending from the lower part of the optical modulation element 102 beyond the position of the light output end 154 toward the short side wall 122 are disposed. In addition, the optical part 1076 is disposed on the base part 1284. Similar to the base part 878, the base part 1284 is more preferably a material having lower thermal conductivity than the material of the modulator housing 804 such as a ceramic substrate from the viewpoint of suppressing thermal conduction to the optical part 1076.

Here, the thickness t4 of the pedestal part 1260 refers to the distance from the upper surface of the second spacer 1282 to the outer surface of the bottom surface wall 828, and, when there is a protrusion and a recess on the upper surface of the second spacer 1282, the thickness t4 is regarded as referring to the average value of the distance from the upper surface of the second spacer 1282 to the outer surface of the bottom surface wall 828 in the range from the light input end 152 to the light output end 154 of the optical modulation element 102.

In the optical modulator 1200 having the above-described configuration, the optical part 1076 is not disposed on the bottom surface wall 828, but is disposed on the base part 1284 fixed to the first spacer 880. Therefore, in the optical modulator 1200, similar to the optical modulator 1000, it is possible to further suppress thermal conduction to the optical part 1076.

However, in the optical modulator 1000 according to the above-described fifth embodiment, both the optical part 1076 and the optical modulation element 102 are disposed on the second spacer 1082. Therefore, when the material of the second spacer 1082 is selected mainly for the suppression of thermal conduction to the optical part 1076, depending on the thermal expansion coefficient of the material, there can be a case where peeling, cracking, or the like occurs at a joining part between the second spacer 1082 and the first spacer 880, a joining part between the second spacer 1082 and the optical modulation element 102, or the optical modulation element 102 itself.

In contrast, in the optical modulator 1200, since the base part 1284 on which the optical part 1076 is disposed and the second spacer 1282 on which the optical modulation element 102 is disposed are separate bodies, it is possible to configure the base part 1284 and the second spacer 1282 using different materials, respectively. Therefore, in the optical modulator 1200, from the viewpoint of the suppression of stress in the optical modulation element 102 and the suppression of thermal conduction to the optical part 1076, respectively, it is possible to more effectively suppress thermal conduction to the optical part 1076 while ensuring reliability by independently selecting the materials of the second spacer 1282 and the base part 1284.

Seventh Embodiment

Figure 14:
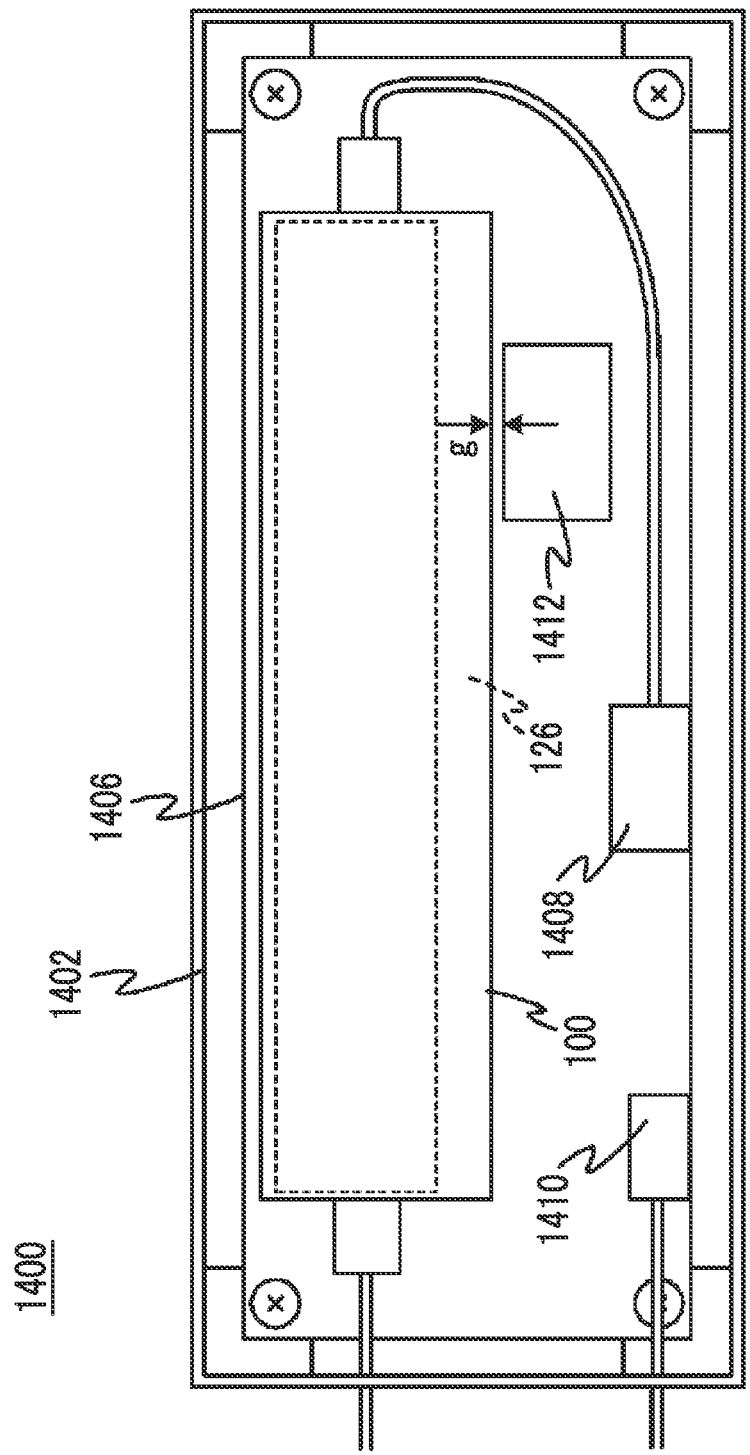
FIG. 14 is a plan view of an optical module according to a seventh embodiment of the present invention.

Next, a seventh embodiment of the present invention will be described. The present embodiment is an optical module mounted with the optical modulator according to the present invention. FIG. 14 is a plan view showing the configuration of an optical module 1400 according to the seventh embodiment.

The optical module 1400 accommodates the optical modulator 100 and a circuit board 1406 in a module housing 1402. In the circuit board 1406, not only the optical modulator 100 is mounted, but a laser diode (LD) 1408 that is a light source of transmission light and a photo diode (PD) 1410, which is an optical receiver of reception light, are also mounted. In addition, in the circuit board 1406, an electronic component that configures an electronic circuit for operating these optical components is mounted. FIG. 14 shows a DSP 1412 for digital signal processing as an example of an electronic component that is an important electronic component and generates a large amount of heat.

Here, other optical components and electronic components may be mounted on the circuit board 1406 depending on functions required for the optical module 1400. Examples of such electronic components include a driver IC for driving the optical modulator 100 and the like. Therefore, the optical module 1400, for example, outputs signal light (transmission light) to one transmission channel optical fiber (not shown) through the optical modulator 100 and receives an optical signal (reception light) that has been transmitted by a different transmission channel optical fiber (not shown) with the PD 1410.

In the optical module 1400, particularly, the optical modulator 100 is mounted on the circuit board 1406 such that the DSP 1412 is disposed close to the vicinity of the end portion of the long side wall 126 with a predetermined clearance g between the DSP 1412 and the long side wall 126. Here, the clearance g is, for example, 2.0 mm.

In the optical module 1400 having the above-described configuration, the optical modulator 100 is mounted such that the DSP 1412, which is a heat-generating electronic part, is disposed on the side of the long side wall 126 having the wall thickness t3 and reduced thermal resistance, which corresponds to the lower side of the optical modulator 100 in the drawing. Therefore, in the optical module 1400, even when the DSP 1412, which is a heat-generating electronic part, is disposed close to the optical modulator 100, characteristic variations and the degradation of long-term reliability in the optical modulator 100 attributed to the above-described close disposition are suppressed. As a result, it is possible to maintain the transmission quality of transmission light that is output from the optical module 1400 at a high level while reducing the size of the optical module 1400 and also to suppress the degradation of long-term reliability in the optical module 1400 as a whole.

It should be noted that, in the present embodiment, the optical module 1400 is configured using the optical modulator 100, but the configuration is not limited to this configuration. The optical module 1400 may be configured by disposing the optical modulator 400, 600, 800, 1000, 1200, or the modification example thereof instead of the optical modulator 100 at the same position as the optical modulator 100 on the circuit board 1406 shown in FIG. 14.

As described above, for example, the optical modulator 100 according to the first embodiment includes the optical modulation element 102 including the optical waveguides 106 formed on a substrate and the modulator housing 104 that accommodates the optical modulation element 102. The modulator housing 104 has the bottom surface wall 128 having a quadrilateral shape in a plan view, the first long side wall 124 and the second long side wall 126 that are connected to two opposite edges of the bottom surface wall 128, and the first short side wall 120 and the second short side wall 122 that are shorter than the first and second long side walls 124 and 126 and are connected to the other two opposite edges of the bottom surface wall 128. In addition, the second long side wall 126 has the wall thickness t3 that is equal to or larger than the wall thickness t2 of the first long side wall 124, and at least one of the first and second short side walls 120 and 122 has the wall thickness t11 or t12 that is thinner than the wall thickness t2 of the first long side wall 124. Furthermore, the optical modulation element 102 is fixed to the pedestal part 160 disposed in a part of the bottom surface wall 128, and highly thermal resistant portions are provided in, for example, the bottom plate portions 162 and 164 which are parts of the bottom surface wall 128 other than the part in which the pedestal part 160 is disposed.

In addition, for example, in the optical modulator 100, it is also possible to configure the average thickness t4 from the upper surface of the pedestal part 160 to the outer surface of the bottom surface wall 128 to be thicker than the average thicknesses t11, t12, t2, and t3 of the first short side wall 120, the second short side wall 122, the first long side wall 124, and the second long side wall 126.

According to these configurations, since heat that has flowed in from a part of the modulator housing 104 immediately propagates through, among the side walls, the second long side wall 126 having the thickest wall thickness t3 and the smallest thermal resistance, even in a case where the optical modulator 100 is disposed close to a heat source such as an electronic component, it is possible to suppress characteristic variations and the degradation of long-term reliability attributed to the above-described close distribution by suppressing the generation of an asymmetric temperature distribution in the modulator housing 104. In addition, when the pedestal part 160 is provided on the bottom surface wall 128, thermal conduction in the length direction of the modulator housing 104 with the pedestal part 160 is further accelerated while suppressing thermal conduction to parts other than the pedestal part 160, for example, the short side walls 120 and 122, whereby it is possible to further suppress the degradation of characteristic variations or long-term reliability attributed to the close disposition of the heat source.

In addition, for example, in the optical modulator 100, the light input end 152 and the light output end 154 of the optical modulation element 102 face the first short side wall 120 and the second short side wall 122, respectively, and the regions that are the highly thermal resistant portions are formed as regions including a part or an entirety of the optical input portion 170 that is the range from the inner surface of the first short side wall 120 to the light input end 152 of the optical modulation element 102 and the optical output portion 172 that is the range from the inner surface of the second short side wall 122 to the light output end 154 of the optical modulation element.

According to this configuration, it is possible to further suppress the degradation of characteristic variations or long-term reliability attributed to the close disposition of the heat source by accelerating thermal conduction in the length direction of the modulator housing 104 while suppressing thermal conduction to the short side walls 120 and 122 on which the optical fiber 108 or the like or the optical component such as the lens 146 or the like can be disposed.

In addition, for example, in the optical modulator 100, the highly thermal resistant portions that are formed on the bottom surface wall 128, for example, the bottom plate portions 162 and 164 are configured such that the average thicknesses t51 and t52 are thinner than the average thickness t4 of the pedestal part 160. According to this configuration, it is possible to realize the highly thermal resistant portions in a simple and inexpensive configuration.

In addition, for example, in the optical modulator 400 according to the above-described second embodiment, the optical part 476 including a first optical component such as a polarization beam combining prism is disposed in the highly thermal resistant portion formed in the optical output portion 172 due to the bottom plate portion 164. In addition, instead of or in addition to this, in the optical modulator 400, it is possible to dispose the first optical component in the highly thermal resistant portion formed in the optical input portion 170 due to the bottom plate portion 162.

According to this configuration, thermal conduction to the first optical component is suppressed, whereby it is possible to stabilize the temperature characteristics or the like of the optical modulator 400 and to improve long-term reliability.

In addition, for example, in the optical modulator 600 according to the above-described third embodiment, for example, the microlens array 142 which is a second optical component is disposed in the light output end 154 of the optical modulation element 102, and the optical modulation element 102 is disposed such that the microlens array 142, which is the second optical component, protrudes outside the range of the pedestal part 660. In addition, instead of or in addition to this, in the optical modulator 600, it is possible to dispose the second optical component that is formed of any optical component in the light input end 152 of the optical modulation element 102 and to dispose the optical modulation element 102 on the pedestal part 160 such that the second optical component protrudes outside the range of the pedestal part 660.

According to this configuration, the conduction of heat from the pedestal part 660 to the optical components disposed in the light input end 152 and/or the light output end 154 of the optical modulation element 102 is prevented, whereby it is possible to stabilize the temperature characteristics or the like of the optical modulator 600 and to improve long-term reliability.

In addition, the optical module according to the above-described seventh embodiment includes, for example, the optical modulator 100 and the DSP 1412 as a heating element which is an electric component accompanying heat generation, and the DSP 1412, which is the heating element, is disposed on the second long side wall 126 side of the optical modulator 100.

According to this configuration, it is possible to effectively suppress the occurrence of characteristic variations and the degradation of long-term reliability in the optical modulator 100 by immediately guiding heat from the DSP 1412, which is a heat-generating electronic part, to the second long side wall 126 having small thermal resistance.

It should be noted that the present invention is not limited to the configurations of the above-described embodiments and can be carried out in a variety of aspects within the scope of the gist of the present invention.

For example, in the optical modulators 100, 400, 600, 800, 1000, and 1200 according to the first to sixth embodiments, one optical modulator may be configured by removing a part of the features that each optical modulator has or combining the features that the optical modulators have. For example, in the optical modulator 400, instead of the optical part 476, the optical part 876 configured on the base part 878 in the optical modulator 800 may be used. In addition, for example, in the configuration of the optical modulator 600, instead of the light output terminal portion 448, the light output terminal portion 148 including the polarization-combining part 145 may be used, and the optical part 476 may not be used in the configuration.

In addition, in all of the embodiments, it has been described that the light input terminal portion 150 and the light output terminal portion 448 are configured to be disposed at the center of the modulator package case in the width direction and the optical modulation element is configured to be disposed at the center of the inside of the modulator package case, but the disposition is not limited thereto.

REFERENCE SIGNS LIST

100, 400, 600, 800, 1000, 1200, 1500 . . . Optical modulator
102, 1502 . . . Optical modulation element
104, 604, 804, 1504 . . . Modulator housing
106 . . . Optical waveguide
108, 1508 . . . Input optical fiber
110, 1510 . . . Output optical fiber
120, 122 . . . Short side wall
124, 126 . . . Long side wall
128, 628, 828, 1528 . . . Bottom surface wall
130, 1550 . . . Center line with respect to width direction
132, 1552 . . . Center line with respect to length direction
140, 1540 . . . Capillary
142, 1542 . . . Microlens array
144-1, 144-2, 1544-1, 1544-2 . . . Reinforcing block
145 . . . Polarization-combining part
146 . . . Lens
148, 448 . . . Light output terminal portion
150 . . . Light input terminal portion
152 . . . Light input end
154 . . . Light output end
160, 660, 860, 1060, 1260 . . . Pedestal part
162, 164, 662, 664, 862, 864 . . . Bottom plate portion
166, 1530 . . . Cover
170 . . . Optical input portion
172 . . . Optical output portion
476, 876, 1076 . . . Optical part
878, 1284 . . . Base part
1400 . . . Optical module
1406, 1702 . . . Circuit board
1408 . . . LD
1410 . . . PD
1412, 1700 . . . DSP
1520, 1522, 1524, 1526 . . . Side surface wall

The invention claimed is:

1. An optical modulator comprising:
an optical modulation element including an optical waveguide formed on a substrate; and
a housing that accommodates the optical modulation element,
wherein the housing has a bottom surface wall having a quadrilateral shape in a plan view, a first long side wall and a second long side wall that are connected to two opposite edges of the bottom surface wall, and a first short side wall and a second short side wall that are shorter than the first long side wall and the second long side wall and are connected to two other opposite edges of the bottom surface wall,
an average thickness of the second long side wall has a wall thickness that is equal to or larger than an average thickness of the first long side wall,
at least one of the first and second short side walls has an average thickness that is thinner than the average thickness of the first long side wall,
the optical modulation element is fixed to a pedestal part disposed in a part of the bottom surface wall,
a highly thermal resistant portion is provided in a part of the bottom surface wall other than the part in which the pedestal part is disposed,
a light input end and a light output end of the optical modulation element face the first short side wall and the second short side wall, respectively, and
a region of the highly thermal resistant portion is formed as a region including a part or an entirety of an optical input portion and/or an optical output portion, wherein the optical input portion is a range from an inner surface of the first short side wall to the light input end of the optical modulation element and the optical output portion is a range from an inner surface of the second short side wall to the light output end of the optical modulation element.

2. An optical modulator comprising:
an optical modulation element including an optical waveguide formed on a substrate; and
a housing that accommodates the optical modulation element,
wherein the housing has a bottom surface wall having a quadrilateral shape in a plan view, a first long side wall and a second long side wall that are connected to two opposite edges of the bottom surface wall, and a first short side wall and a second short side wall that are shorter than the first long side wall and the second long side wall and are connected to two other opposite edges of the bottom surface wall,
the optical modulation element is fixed to a pedestal part disposed in a part of the bottom surface wall,
an average thickness of the pedestal part is thicker than average thicknesses of the first short side wall, the second short side wall, the first long side wall, and the second long side wall,
a highly thermal resistant portion is provided in a part of the bottom surface wall other than the part in which the pedestal part is disposed,
a light input end and a light output end of the optical modulation element face the first short side wall and the second short side wall, respectively, and
a region of the highly thermal resistant portion is formed as a region including a part or an entirety of an optical input portion and/or an optical output portion, wherein the optical input portion is a range from an inner surface of the first short side wall to the light input end of the optical modulation element and the optical output portion is a range from an inner surface of the second short side wall to the light output end of the optical modulation element.

3. The optical modulator according to claim 1,
wherein an average thickness of the highly thermal resistant portion is thinner than the average thickness of the pedestal part.

4. The optical modulator according to claim 1,
wherein a first optical component is disposed in the optical input portion or the optical output portion.

5. The optical modulator according to claim 1,
wherein a second optical component is disposed in at least one end part of the optical modulation element, and
in the optical modulation element, the second optical component is disposed so as to protrude outside a range of the pedestal part.

6. The optical modulator according to claim 1,
wherein the optical modulation element is an interference type optical modulation element that operates by causing two light rays that propagate through the optical waveguides extending in a length direction of the optical modulation element to interfere with each other.

7. An optical module comprising:
the optical modulator according to claim 1; and
a heating element that is an electric component accompanying heat generation,
wherein the heating element is disposed at a side of the second long side wall of the optical modulator.

8. The optical modulator according to claim 2,
wherein an average thickness of the highly thermal resistant portion is thinner than the average thickness of the pedestal part.

9. The optical modulator according to claim 2,
wherein a first optical component is disposed in the optical input portion or the optical output portion.

* * * * *